US012716044B2

(12) United States Patent
Kieffer et al.

(10) Patent No.: US 12,716,044 B2
(45) Date of Patent: *Aug. 25, 2026

(54) SOLID FAST DRAINING/DRYING RINSE AID FOR HIGH TOTAL DISSOLVED SOLID WATER CONDITIONS

(71) Applicant: ECOLAB USA INC., Saint Paul, MN (US)

(72) Inventors: Janel M. Kieffer, Saint Paul, MN (US); Victor Fuk-Pong Man, Saint Paul, MN (US); Melissa Hunter, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 169 days.

This patent is subject to a terminal disclaimer.

(21) Appl. No.: 18/489,183

(22) Filed: Oct. 18, 2023

(65) Prior Publication Data

US 2024/0052267 A1 Feb. 15, 2024

Related U.S. Application Data

(60) Continuation of application No. 17/812,296, filed on Jul. 13, 2022, now Pat. No. 11,827,865, which is a continuation of application No. 15/975,843, filed on May 10, 2018, now Pat. No. 11,421,185, which is a division of application No. 15/392,764, filed on Dec. 28, 2016, now Pat. No. 10,421,933, which is a continuation of application No. 14/659,679, filed on Mar. 17, 2015, now Pat. No. 10,000,725, which is a continuation-in-part of application No. 14/010,815, filed on Aug. 27, 2013, now Pat. No. 9,567,551, which is a continuation of application No. 13/530,152, filed on Jun. 22, 2012, now Pat. No. 9,011,610.

(51) Int. Cl.

| | |
|---|---|
| ***C11D 17/00*** | (2006.01) |
| ***C11D 1/66*** | (2006.01) |
| ***C11D 1/72*** | (2006.01) |
| ***C11D 1/722*** | (2006.01) |
| ***C11D 1/825*** | (2006.01) |
| ***C11D 3/00*** | (2006.01) |
| ***C11D 3/04*** | (2006.01) |
| ***C11D 3/20*** | (2006.01) |
| ***C11D 3/34*** | (2006.01) |

(52) U.S. Cl.

CPC ............ *C11D 17/0047* (2013.01); *C11D 1/66* (2013.01); *C11D 1/72* (2013.01); *C11D 1/722* (2013.01); *C11D 1/825* (2013.01); *C11D 3/0021* (2013.01); *C11D 3/042* (2013.01); *C11D 3/2068* (2013.01); *C11D 3/2075* (2013.01); *C11D 3/2082* (2013.01); *C11D 3/2086* (2013.01); *C11D 3/3418* (2013.01); *C11D 3/3463* (2013.01); *C11D 2111/14* (2024.01); *C11D 2111/16* (2024.01); *C11D 2111/18* (2024.01)

(58) Field of Classification Search

None

See application file for complete search history.

(56) References Cited

U.S. PATENT DOCUMENTS

| | | | |
|---|---|---|---|
| 4,001,132 | A | 1/1977 | Maguire, Jr. |
| 4,426,362 | A | 1/1984 | Copeland et al. |
| 4,492,646 | A | 1/1985 | Welch |
| 4,618,914 | A | 10/1986 | Sato et al. |
| 4,647,258 | A | 3/1987 | Massarsch |
| 4,654,161 | A | 3/1987 | Kollmeier et al. |
| 4,687,121 | A | 8/1987 | Copeland |
| 4,690,305 | A | 9/1987 | Copeland |
| RE32,763 | E | 10/1988 | Fernholtz et al. |
| RE32,818 | E | 1/1989 | Fernholtz et al. |
| 4,826,661 | A | 5/1989 | Copeland et al. |
| 4,830,773 | A | 5/1989 | Olson |
| 5,273,677 | A | 12/1993 | Arif |
| 5,358,653 | A | 10/1994 | Gladfelter et al. |
| 5,397,506 | A | 3/1995 | Groth et al. |
| 5,474,698 | A | 12/1995 | Rolando et al. |
| 5,501,815 | A | 3/1996 | Man |

(Continued)

FOREIGN PATENT DOCUMENTS

| | | | |
|---|---|---|---|
| DE | 69918694 | T2 | 7/2005 |
| EP | 0019484 | A1 | 11/1980 |

(Continued)

OTHER PUBLICATIONS

BASF Corporation Technical Bulletin, "Plurafac LF-221 Alcohol Alkoxylate", 2002 BASF Corporation, Mount Olive, New Jersey (1 page). Dec. 31, 2002.

(Continued)

*Primary Examiner* — Lorna M Douyon

(74) *Attorney, Agent, or Firm* — McKee, Voorhees & Sease, PLC

(57) ABSTRACT

The present invention is a solid rinse aid composition and methods of making and using the same. Applicants have surprisingly found that the crystal modifier sodium xylene sulfonate (short chain alkyl benzene or alkyl naphthalene sulfonates) at higher percentage can act as a solidification agent. The solid rinse aid composition generally includes a short chain alkyl benzene or alkyl naphthalene sulfonates solidification agent and an effective amount of a surfactant which can include a sheeting agent component, defoamer component and/or association disruption agent. The solid rinse aid composition may be phosphate-free, aminocarboxylate-free, and GRAS if desired.

16 Claims, 1 Drawing Sheet

(56) References Cited

U.S. PATENT DOCUMENTS

| | | | |
|---|---|---|---|
| 5,589,099 | A | 12/1996 | Baum |
| 5,603,776 | A | 2/1997 | Lentsch et al. |
| 5,635,167 | A | 6/1997 | Said et al. |
| 5,674,831 | A | 10/1997 | Schulz et al. |
| 5,858,946 | A | 1/1999 | Foley et al. |
| 5,876,514 | A | 3/1999 | Rolando et al. |
| 5,880,088 | A | 3/1999 | Lentsch et al. |
| 5,880,089 | A | 3/1999 | Lentsch et al. |
| H1818 | H | 11/1999 | Potgieter et al. |
| 6,211,129 | B1 | 4/2001 | Gladfelter et al. |
| 6,257,253 | B1 | 7/2001 | Lentsch et al. |
| 6,258,765 | B1 | 7/2001 | Wei et al. |
| 6,294,515 | B1 | 9/2001 | Baum |
| 6,432,906 | B1 | 8/2002 | Carlson et al. |
| 6,530,383 | B1 | 3/2003 | Rogmann et al. |
| 6,537,961 | B1 | 3/2003 | Koch |
| RE38,262 | E | 10/2003 | Rolando et al. |
| 6,630,440 | B1 | 10/2003 | Song et al. |
| 6,956,019 | B2 | 10/2005 | Lentsch et al. |
| 6,964,943 | B1 | 11/2005 | Bettiol et al. |
| 7,279,455 | B2 | 10/2007 | Kieffer et al. |
| 7,521,412 | B2 | 4/2009 | Kieffer et al. |
| 7,592,301 | B2 | 9/2009 | Smith et al. |
| 7,838,485 | B2 | 11/2010 | Heisig et al. |
| 7,960,333 | B2 | 6/2011 | Kieffer et al. |
| 8,324,147 | B2 | 12/2012 | Kieffer et al. |
| 8,383,570 | B2 | 2/2013 | Kieffer et al. |
| 8,450,264 | B1 | 5/2013 | Kieffer et al. |
| 8,957,011 | B2 | 2/2015 | Kieffer |
| 9,011,610 | B2 | 4/2015 | Kieffer |
| 9,567,551 | B2 | 2/2017 | Sun |
| 10,000,725 | B2 | 6/2018 | Kieffer et al. |
| 10,081,781 | B2 | 9/2018 | Foster et al. |
| 10,421,933 | B2 | 9/2019 | Sun et al. |
| 11,421,185 | B2 | 8/2022 | Kieffer et al. |
| 11,827,865 | B2 | 11/2023 | Kieffer et al. |
| 2001/0031714 | A1 | 10/2001 | Gassenmeier |
| 2002/0028754 | A1 | 3/2002 | Johansen et al. |
| 2002/0192340 | A1 | 12/2002 | Swart et al. |
| 2003/0109403 | A1 | 6/2003 | Man et al. |
| 2003/0162678 | A1 | 8/2003 | Ashton et al. |
| 2003/0162689 | A1 | 8/2003 | Schymitzek et al. |
| 2003/0166494 | A1 | 9/2003 | Man et al. |
| 2003/0171243 | A1 | 9/2003 | Kischkel et al. |
| 2003/0195134 | A1 | 10/2003 | Vandijk et al. |
| 2004/0033269 | A1 | 2/2004 | Hei et al. |
| 2004/0110657 | A1 | 6/2004 | Strothoff |
| 2004/0157760 | A1 | 8/2004 | Man et al. |
| 2004/0180807 | A1 | 9/2004 | Song |
| 2005/0020466 | A1 | 1/2005 | Man et al. |
| 2005/0101516 | A1 | 5/2005 | Kieffer et al. |
| 2005/0130865 | A1 | 6/2005 | Schmid et al. |
| 2005/0143280 | A1 | 6/2005 | Nelson et al. |
| 2006/0058209 | A1 | 3/2006 | Lentsch et al. |
| 2006/0189508 | A1 | 8/2006 | Brooker et al. |
| 2006/0246242 | A1 | 11/2006 | Siegel et al. |
| 2007/0253926 | A1 | 11/2007 | Tadrowski et al. |
| 2008/0234173 | A1 | 9/2008 | Warr et al. |
| 2008/0293615 | A1 | 11/2008 | Kieffer et al. |
| 2009/0035339 | A1 | 2/2009 | Istvan et al. |
| 2009/0196897 | A1 | 8/2009 | Gladfelter et al. |
| 2009/0203569 | A1 | 8/2009 | Kieffer et al. |
| 2010/0009886 | A1 | 1/2010 | Smith et al. |
| 2010/0292127 | A1 | 11/2010 | Kieffer et al. |
| 2010/0300044 | A1 | 12/2010 | Man et al. |
| 2011/0126858 | A1 | 6/2011 | Song |
| 2012/0231992 | A1 | 9/2012 | Kieffer et al. |
| 2013/0345112 | A1 | 12/2013 | Sun et al. |
| 2016/0060579 | A1 | 3/2016 | Silvernail et al. |
| 2017/0298298 | A1 | 10/2017 | Kieffer et al. |
| 2021/0292681 | A1 | 9/2021 | Kieffer et al. |
| 2024/0043774 | A1 | 2/2024 | Kieffer et al. |
| 2024/0101931 | A1 | 3/2024 | Kieffer et al. |

FOREIGN PATENT DOCUMENTS

| | | | |
|---|---|---|---|
| EP | 0231603 | A1 | 8/1987 |
| EP | 0875556 | A2 | 11/1998 |
| EP | 1352951 | A1 | 10/2003 |
| EP | 1102834 | B1 | 7/2004 |
| JP | 2010508901 | A | 9/1998 |
| JP | 2002522592 | A | 7/2002 |
| JP | 2003534390 | A | 11/2003 |
| JP | 2004204016 | | 7/2004 |
| JP | 2006208873 | A | 8/2006 |
| JP | 200777290 | A | 3/2007 |
| JP | 2009111294 | A | 5/2009 |
| JP | 2012510341 | A | 5/2012 |
| JP | 2013512041 | A | 4/2013 |
| JP | 2016534204 | A | 11/2016 |
| WO | 8911525 | A1 | 11/1989 |
| WO | 9220774 | A1 | 11/1992 |
| WO | 199305141 | A1 | 3/1993 |
| WO | 199909126 | A1 | 2/1999 |
| WO | 0008125 | A1 | 2/2000 |
| WO | 0046327 | A1 | 8/2000 |
| WO | 0183879 | A1 | 11/2001 |
| WO | 2005047440 | A1 | 5/2005 |
| WO | 2005085321 | A1 | 9/2005 |
| WO | 2007049249 | A1 | 5/2007 |
| WO | 2008146177 | A1 | 12/2008 |
| WO | 2010131217 | A1 | 11/2010 |
| WO | 2011066206 | A1 | 6/2011 |
| WO | 2011112674 | | 9/2011 |

OTHER PUBLICATIONS

DOW Personal Care, "KATHON CG, A Safe, Effective, Globally Approved Preservative for Rinse-Off Products", Rohm and Haas, 2007 (9 pages). Dec. 31, 2007.

Ecolab USA Inc., PCT/US2013/059013 filed Sep. 10, 2013, "The International Search Report and the Written Opinion of the International Searching Authority, or the Declaration", mailed Nov. 20, 2013.

Ecolab USA Inc., PCT/US2013/046589 filed une 19, 2013, "The International Search Report and the Written Opinion of the International Searching Authority, or the Declaration", mailed Sep. 24, 2013.

Burns, Robert L., "Hydrotropic Properties of Some Short-Chain Alkylbenzene- and Alkylnaphthalene Sulfonates", Journal of Surfactants and Detergents, vol. 2, No. 1, pp. 13-16. Jan. 31, 1999.

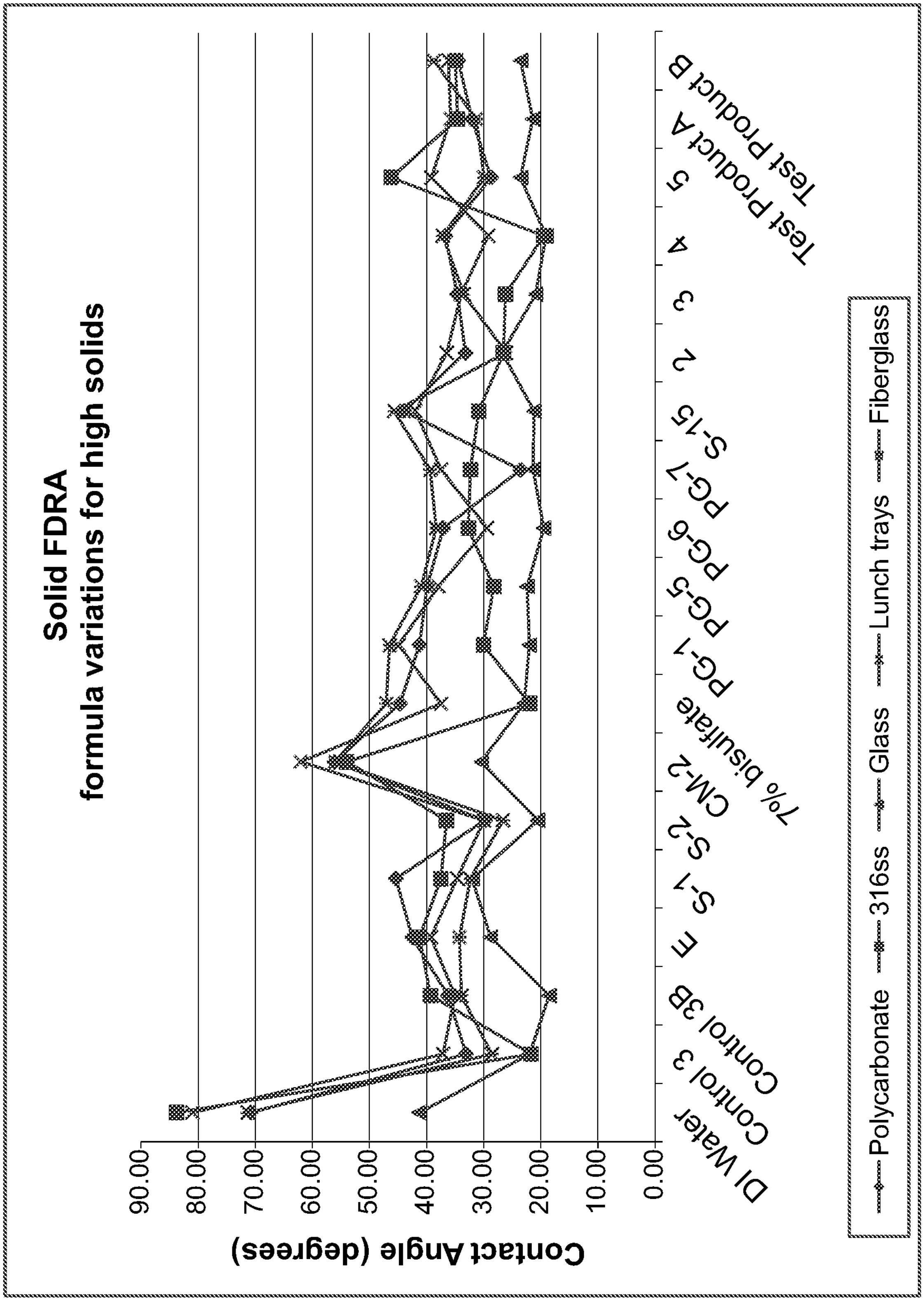
Solid FDRA
formula variations for high solids
Contact Angle (degrees)
90.00
80.00
70.00
60.00
50.00
40.00
30.00
20.00
10.00
0.00
DI Water
Control 3
Control 3B
E
S-1
S-2
CM-2
7% bisulfate
PG-1
PG-5
PG-6
PG-7
S-15
2
3
4
5
Test Product A
Test Product B
Polycarbonate
316ss
Glass
Lunch trays
Fiberglass

SOLID FAST DRAINING/DRYING RINSE AID FOR HIGH TOTAL DISSOLVED SOLID WATER CONDITIONS

CROSS REFERENCE TO RELATED APPLICATION

This is a continuation of U.S. Ser. No. 17/812,296, filed Jul. 13, 2022, now U.S. Pat. No. 11,827,865, issued Nov. 28, 2023, which is a continuation application of U.S. Ser. No. 15/975,843, filed May 10, 2018, now U.S. Pat. No. 11,421,185, issued Aug. 23, 2022, which is a divisional application of U.S. Ser. No. 15/392,764, filed Dec. 28, 2016, now U.S. Pat. No. 10,421,933, issued Sep. 24, 2019, which is a continuation application of U.S. Ser. No. 14/659,679, filed Mar. 17, 2015, now U.S. Pat. No. 10,000,725, issued Jun. 19, 2018, which is a continuation-in-part application of U.S. Ser. No. 14/010,815, filed Aug. 27, 2013, now U.S. Pat. No. 9,567,551, issued Feb. 14, 2017, which is a continuation application of U.S. Ser. No. 13/530,152, filed Jun. 22, 2012, now U.S. Pat. No. 9,011,610, issued Apr. 21, 2015, all of which are herein incorporated by reference in their entireties.

FIELD OF INVENTION

The present invention relates to solid rinse aid compositions, and methods for manufacturing and using the same. The rinse aid compositions generally include a novel solidification system and surfactants which may include a sheeting agent, a defoaming agent, and an association disruption agent. The rinse aids can be used in aqueous use solutions on articles including, for example, cookware, dishware, flatware, glasses, cups, hard surfaces, glass surfaces, vehicle surfaces, etc. The rinse aids can also be used as wetting agents for use in aseptic filling procedures.

BACKGROUND

Mechanical warewashing machines have been common in the institutional and household environments for many years. Such automatic warewashing machines clean dishes using two or more cycles which can include initially a wash cycle followed by a rinse cycle, but may also utilize soak, pre-wash, scrape, sanitizing, drying, and additional wash cycles. Rinse agents are conventionally used in warewashing applications to promote drying and to prevent the formation of spots.

In order to reduce the formation of spotting, rinse agents have commonly been added to water to form an aqueous rinse that is sprayed on the dishware after cleaning is complete. The precise mechanism through which rinse agents work is not established. One theory holds that the surfactant in the rinse agent is absorbed on the surface at temperatures at or above its cloud point, and thereby reduces the solid-liquid interfacial energy and contact angle. This leads to the formation of a continuous sheet which drains evenly from the surface and minimizes the formation of spots. Generally, high foaming surfactants have cloud points above the temperature of the rinse water, and, according to this theory, would not promote sheet formation, thereby resulting in spots. Moreover, high foaming materials are known to interfere with the operation of warewashing machines.

A number of rinse aids are currently known, each having certain advantages and disadvantages. There is an ongoing need for alternative rinse aid compositions, especially alternative rinse aid compositions that are environmentally friendly (e.g., biodegradable), and that essentially include components that are suitable for use in food service industries, e.g. GRAS ingredients (generally recognized as safe by the USFDA, partial listing available at 21 C.F.R. §§ 184).

SUMMARY OF THE INVENTION

Applicants have surprisingly found that the short-chain alkylbenzene and alkyl naphthalene sulfonates class of hydrotropes which are traditionally included at low concentrations in detergents and rinse aids, when included at higher percentages, can act as a solidification aid. This class typically includes sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and/or sodium butylnaphthalene.

A solid rinse agent composition of the present invention thus includes a solidification system including a short chain alkyl benzene and/or alkyl naphthalene sulfonate, preferably sodium xylene sulfonate (SXS), and a surfactant system. The surfactant can include a sheeting agent of one or more alcohol ethoxylates. The solid rinse aid composition may advantageously be formulated to phosphate-free and aminocarboxylate-free, as well as containing only ingredients generally recognized as safe (GRAS) for human consumption.

In at least some embodiments, the solid rinse aid includes a surfactant system with a sheeting agent component comprising one or more alcohol ethoxylates that include an alkyl group that includes 12 or fewer carbon atoms and is a solid at room temperature. For example, in some embodiments, the rinse aid can include a sheeting agent component including one or more alcohol ethoxylates having the general formula:

$$R—O—(CH_2CH_2O)_n—H$$

wherein R is a ($C_1$-$C_{12}$) alkyl group, and n is an integer in the range of 1 to 100.

The rinse aid surfactant system can also include an effective amount of defoamer component configured for reducing the stability of foam that may be created by the alcohol ethoxylate in an aqueous solution. In other embodiments, the defoaming agent comprises a polymer compound including one or more ethylene oxide groups. In yet other embodiments, the defoaming agent includes a polyether compound prepared from ethylene oxide, propylene oxide, or a mixture thereof. In still yet other embodiments, the defoaming agent comprises a polyoxypropylene-polyoxyethylene block copolymer surfactant.

In some embodiments, the solid rinse aid surfactant system includes one or more association disruption agent comprising an alcohol alkoxylate. In other embodiments, the association disruption agent is selected from the group consisting of ethylene oxides, propylene oxides, butylene oxides, pentylene oxides, hexylene oxides, heptylene oxides, octylene oxides, nonylene oxides, decylene oxides, and mixtures and derivatives thereof.

Some embodiments of the inventive solid rinse aid composition also include a GRAS preservative system for acidification of the solid rinse aid including sodium bisulfate and organic acids. The use solution can be neutral or acidic. In at least some embodiments, a use solution of the solid rinse aid has a pH that is less than pH 4, and often less than pH 2.

Some example methods, including heating and vigorous mixing are described for processing the rinse aid compositions, generally include the steps of combining the sodium xylene sulfonate and sheeting component, as well as any optional defoamer, disruption aid, and, if desired, any other suitable additives so as to produce the rinse aid. These steps are followed by casting, extruding, or the like to form solid product or simply by pressing to form a pressed solid. The rinse aid can be provided as a concentrate or as a use solution. The rinse aid concentrate is typically provided in a solid form. In general, it is expected that the concentrate will be diluted with water to provide the use solution that is then supplied to the surface of a substrate. The use solution preferably contains an effective amount of active material to provide reduced water solids filming in rinse water. It should be appreciated that the term "active materials" refers to the nonaqueous portion of the use solution that functions to reduce spotting and water solids filming.

Some example methods for using the rinse aid generally include the step of providing the rinse aid, mixing the rinse aid into an aqueous use solution, and applying the aqueous use solution to a substrate surface.

In some embodiments, the hardening agent of a short chain alkyl benzene or alkyl naphthalene sulfonate is present 60 wt % to 90 wt % and the surfactant package is present at 5 wt % to 35 wt %. The solid rinse aid can also in some embodiments and as enumerated hereinafter, include an additional solidification component such as polyethylene glycol or urea. The additional solidification agent is used is present in an amount for from about 0.1 wt % to about 10 wt %.

The surfactant package can comprise a sheeting agent present at about 1 wt % to about 10 wt %. In other embodiments, the sheeting agent is present at about 2 wt % to about 5 wt %. In still yet other embodiments, the defoaming agent is present at about 1 wt % to about 20 wt %. In still yet other embodiments, the surfactant system includes a defoaming agent present at about 1 wt % to about 15 wt %. In some embodiments, the surfactant system with one or more association disruption agent is present at between about 1 wt % to about 25 wt %. In other embodiments, the one or more disruption agent is present at between about 10 wt % to about 20 wt %.

In some embodiments, the surfactant package includes a ratio of sheeting agent to defoaming agent to association disrupting agent in the surfactant package is about 1.0:1.5:30 to about 1:2:1. In other embodiments, the association disruption agent is present at an amount effective to reduce the contact angle of the composition by between about 5° to about 15°. In still yet other embodiments, the additional ingredient comprises at least about 50 wt % of a carrier. In other embodiments, the carrier comprises water.

In some aspects, the present invention is related to methods for rinsing ware in a warewashing application. The methods comprise providing an aqueous rinse aid composition, the rinse aid composition consisting essentially of: a sheeting agent, a defoaming agent, one or more of an association disruption agent; a hardening agent of short chain alkyl benzene or alkyl naphthalene sulfonate and an if desired, any additional ingredients such as a carrier, a hydrotrope, a chelating/sequestering agent, and combinations thereof. The method also comprises diluting the rinse aid composition with water to form an aqueous use solution; and applying the aqueous use solution to the ware.

In some embodiments, the ware comprises plasticware. In other embodiments, the ware dries within about 30 to about 90 seconds after the aqueous solution is applied to the ware.

DESCRIPTION OF THE FIGURES

FIG. 1 is a graph showing the contact angle of different formulations on polycarbonate, 316 stainless steel, glass, lunch trays and fiberglass.

DETAILED DESCRIPTION OF THE INVENTION

The present invention relates to rinse aid compositions, and methods for making and using rinse aid compositions. In some aspects, the present invention provides rinse aid compositions including a sheeting agent, a defoaming agent, and one or more of an association disruption agent. It has been found that the combination of a sheeting agent, a defoaming agent, and one or more association disruption agent acts synergistically to produce a low foaming rinse aid composition with a moderately low viscoelasticity and increased wetting properties. Further, the rinse aid compositions of the present invention have increased drying and draining times compared to conventional rinse aid compositions.

The compositions of the present invention can be used to reduce spotting and filming on a variety of surfaces including, but not limited to, plasticware, cookware, dishware, flatware, glasses, cups, hard surfaces, glass surfaces, and vehicle surfaces. The compositions of the invention can also be used as wetting agents in a variety of applications, e.g., aseptic packaging/filling. So that the invention may be understood more clearly, certain terms are first defined.

As used herein, the term "antiredeposition agent" refers to a compound that helps keep a soil composition suspended in water instead of redepositing onto the object being cleaned.

As used herein, the term "ware" refers to items such as eating, cooking, and serving utensils. Exemplary items of ware include, but are not limited to: dishes, e.g., plates and bowls; silverware, e.g., forks, knives, and spoons; cups and glasses, e.g., drinking cups and glasses; serving dishes, e.g., fiberglass trays, insulated plate covers. As used herein, the term "warewashing" refers to washing, cleaning, or rinsing ware. The items of ware that can be contacted, e.g., washed, or rinsed, with the compositions of the invention can be made of any material. For example, ware includes items made of wood, metal, ceramics, glass, etc. Ware also refers to items made of plastic. Types of plastics that can be cleaned or rinsed with the compositions according to the invention include but are not limited to, those that include polycarbonate polymers (PC), acrylonitrile-butadiene-styrene polymers (ABS), and polysulfone polymers (PS). Another exemplary plastic that can be cleaned using the methods and compositions of the invention include polyethylene terephthalate (PET).

As used herein, the term "hard surface" includes showers, sinks, toilets, bathtubs, countertops, windows, mirrors, transportation vehicles, floors, and the like.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of autoclaves and sterilizers, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of autoclaves and sterilizers, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the term "instrument" refers to the various medical or dental instruments or devices that can benefit from cleaning using water treated according to the methods of the present invention.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning using water treated according to the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthroscopes) and related equipment, and the like, or combinations thereof.

By the term "solid" as used to describe a composition of the present invention, it is meant that the hardened composition will not flow perceptibly and will substantially retain its shape under moderate stress or pressure or mere gravity, as for example, the shape of a mold when removed from the mold, the shape of an article as formed upon extrusion from an extruder, and the like. The degree of hardness of the solid composition can range from that of a fused solid block which is relatively dense and hard, for example, like concrete, to a consistency characterized as being malleable and sponge-like, similar to caulking material.

The "cloud point" of a surfactant rinse or sheeting agent is defined as the temperature at which a 1 wt. % aqueous solution of the surfactant turns cloudy when warmed.

As used herein, the term "alkyl" refers to a straight or branched chain monovalent hydrocarbon radical optionally containing one or more heteroatomic substitutions independently selected from S, O, Si, or N. Alkyl groups generally include those with one to twenty atoms. Alkyl groups may be unsubstituted or substituted with those substituents that do not interfere with the specified function of the composition. Substituents include alkoxy, hydroxy, mercapto, amino, alkyl substituted amino, or halo, for example. Examples of "alkyl" as used herein include, but are not limited to, methyl, ethyl, n-propyl, n-butyl, n-pentyl, isobutyl, and isopropyl, and the like. In addition, "alkyl" may include "alylenes", "alkenylenes", or "alkylynes".

As used herein, the term "alkylene" refers to a straight or branched chain divalent hydrocarbon radical optionally containing one or more heteroatomic substitutions independently selected from S, O, Si, or N. Alkylene groups generally include those with one to twenty atoms. Alkylene groups may be unsubstituted or substituted with those substituents that do not interfere with the specified function of the composition. Substituents include alkoxy, hydroxy, mercapto, amino, alkyl substituted amino, or halo, for example. Examples of "alkylene" as used herein include, but are not limited to, methylene, ethylene, propane-1,3-diyl, propane-1,2-diyl and the like.

As used herein, the term "alkenylene" refers to a straight or branched chain divalent hydrocarbon radical having one or more carbon-carbon double bonds and optionally containing one or more heteroatomic substitutions independently selected from S, O, Si, or N. Alkenylene groups generally include those with one to twenty atoms. Alkenylene groups may be unsubstituted or substituted with those substituents that do not interfere with the specified function of the composition. Substituents include alkoxy, hydroxy, mercapto, amino, alkyl substituted amino, or halo, for example. Examples of "alkenylene" as used herein include, but are not limited to, ethene-1,2-diyl, propene-1,3-diyl, and the like.

As used herein, the term "alkylyne" refers to a straight or branched chain divalent hydrocarbon radical having one or more carbon-carbon triple bonds and optionally containing one or more heteroatomic substitutions independently selected from S, O, Si, or N. Alkylyne groups generally include those with one to twenty atoms. Alkylyne groups may be unsubstituted or substituted with those substituents that do not interfere with the specified function of the composition. Substituents include alkoxy, hydroxy, mercapto, amino, alkyl substituted amino, or halo, for example.

As used herein, the term "alkoxy", refers to —O-alkyl groups wherein alkyl is as defined above.

As used herein, the term "halogen" or "halo" shall include iodine, bromine, chlorine and fluorine.

As used herein, the terms "mercapto" and "sulfhydryl" refer to the substituent —SH.

As used herein, the term "hydroxy" refers to the substituent —OH.

A used herein, the term "amino" refers to the substituent $—NH_2$.

The methods and compositions of the present invention can comprise, consist of, or consist essentially of the listed steps or ingredients. As used herein the term "consisting essentially of" shall be construed to mean including the listed ingredients or steps and such additional ingredients or steps which do not materially affect the basic and novel properties of the composition or method. In some embodiments, a composition in accordance with embodiments of the present invention that "consists essentially of" the recited ingredients does not include any additional ingredients that alter the basic and novel properties of the composition, e.g., the drying time, sheeting ability, spotting or filming properties of the composition.

As used herein, "weight percent (wt %)," "percent by weight," "% by weight," and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

Solid Rinse Aid Compositions

A solid rinse agent composition of the present invention includes a solidification system including one or more of sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butylnaphthalene sulfonate, and a surfactant system with a sheeting agent comprising one or more alcohol ethoxylates. The solid rinse aid composition may advantageously be formulated to phosphate-free and aminocarboxylate-free, as well as containing only ingredients generally recognized as safe (GRAS) for human consumption. The surfactant system can also include a defoaming agent and/or one or more association disruption agents.

The class of short chain alkyl benzene or alkyl naphthalene hydrotropes includes alkyl benzene sulfonates based on toluene, xylene, and cumene, and alkyl naphthalene sulfonates. Sodium toluene sulfonate and sodium xylene sulfonate are the best known hydrotropes. These have the general formula below:

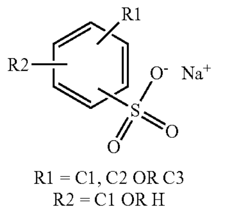

R1 = C1, C2 OR C3
R2 = C1 OR H
ALKYLBENZENE SULFONATE

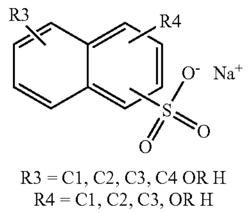

R3 = C1, C2, C3, C4 OR H
R4 = C1, C2, C3, OR H
ALKYLNAPHTHALENE SULFONATE

This group includes but is not limited to sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butylnaphthalene sulfonate. In a preferred embodiment the solidification agent is SXS.

The invention provides a solid rinse aid composition including effective amounts of a hardening agent of a short chain alkyl benzene or alkyl naphthalene sulfonate. Surprisingly, this class of hydrotropes has been found to add to performance of the solid rinse aid as well as functioning as solidification agent. The short chain alkyl benzene or alkyl naphthalene sulfonate may also function as a builder. The solid rinse aid composition typically has a melt point greater than 110° F. and is dimensionally stable. In some embodiments, the hardening agent of a short chain alkyl benzene or alkyl naphthalene sulfonate is present 60 wt % to 90 wt %. The solid rinse aid can also in some embodiments and as enumerated hereinafter, include an additional solidification component such as polyethylene glycol, or urea. The additional solidification agent if used is present in an amount of from about 0.1 wt % to about 10 wt %.

The solid rinse aid includes a surfactant system of a sheeting agent comprising an effective amount of one or more alcohol ethoxylates that include an alkyl group that includes 12 or fewer carbon atoms. Preferably, one or more of the alcohol ethoxylates are solid at room temperature. For example, in some embodiments, the rinse aid sheeting agent including one or more alcohol ethoxylates having the general formula:

$$R—O—(CH_2CH_2O)_n—H$$

wherein R is a ($C_1$-$C_{12}$) alkyl group, and n is an integer in the range of 1 to 100. The surfactant package is present at 5 wt % to 35 wt %. The surfactant package can comprise a sheeting agent present at about 1 wt % to about 10 wt % of the rinse aid composition. In other embodiments, the sheeting agent is present at about 2 wt % to about 5 wt % of the rinse aid composition.

The solid rinse aid compositions may also include other functional agents and active ingredients that will vary according to the type of rinse aid composition being manufactured in the solid matrix formed by the short chain alkyl benzene or alkyl naphthalene sulfonate. The invention further provides methods for making solid rinse aid compositions, including effective amounts of one or more short chain alkyl benzene or alkyl naphthalene sulfonate in combination with alcohol ethoxylate sheeting agent.

The rinse aid also optionally includes an effective amount of defoamer component configured for reducing the stability of foam that may be created by the alcohol ethoxylate in an aqueous solution. The defoaming agent is present at about 1 wt % to about 20 wt % of the solid rinse aid composition. In still yet other embodiments, the defoaming agent is present at about 1 wt % to about 15 wt % of the rinse aid composition.

In some embodiments, the surfactant system includes one or more association disruption agents comprising an alcohol alkoxylate. In other embodiments, the association disruption agent is selected from the group consisting of ethylene oxides, propylene oxides, butylene oxides, pentylene oxides, hexylene oxides, heptylene oxides, octylene oxides, nonylene oxides, decylene oxides, and mixtures and derivatives thereof. In some embodiments, the surfactant system with one or more association disruption agent is present at between about 1 wt % to about 25 wt %. In other embodiments, the one or more disruption agent is present at between about 10 wt % to about 20 wt %.

In some embodiments, the surfactant package includes a ratio of sheeting agent to defoaming agent to association disrupting agent in the surfactant package is about 1.0:1.5:30 to about 1:2:1. In other embodiments, the association disruption agent is present at an amount effective to reduce the contact angle of the composition by between about 5° to about 15°. In still yet other embodiments, the additional ingredient comprises at least about 50 wt % of a carrier. In other embodiments, the carrier comprises water.

In some embodiments of the inventive solid rinse aid composition also include a novel GRAS preservative system for acidification of the solid rinse aid including sodium bisulfate and organic acids preferably benzoic and sorbic acid. In at least some embodiments, the solid rinse aid has pH of 2.0 or less and the use solution of the solid rinse aid has a pH of at least pH 4.0.

Typically, the solid rinse aid is formulated to include components that are suitable for use in food service industries, e.g., GRAS ingredients, a partial listing is available at 21 CFR 184. In some embodiments, the solid rinse aid is formulated to include only GRAS ingredients. In other embodiments, the solid rinse aid is formulated to include GRAS and biodegradable ingredients. In addition, the solid rinse aid may be formulated to be environmentally friendly by excluding phosphates and aminocarboxylates.

The rinse aid composition is provided as a solid. Typically, the solid rinse aid is provided as a solid block or pellet. It is expected that blocks will have a size of at least about 5 grams, and can include a size of greater than about 50 grams. For the purpose of this application the term "solid block" includes extruded pellet materials having a weight of 50 grams up through 250 grams, an extruded solid with a weight of about 100 grams or greater or a solid block rinse aid having a mass between about 1 and 10 kilograms.

Solidification Agents

The rinse aid composition includes an effective amount a short chain alkyl benzene or alkyl naphthalene sulfonate, which surprisingly when used alone can function as a solidification agent. In general, an effective amount of short chain alkyl benzene or alkyl naphthalene sulfonate is considered an amount that acts with or without other materials to solidify the rinse aid composition. Typically, the amount of short chain alkyl benzene or alkyl naphthalene sulfonate is present in an amount of from about 60 wt % to about 90 wt %. In other embodiments, the short chain alkyl benzene or alkyl naphthalene sulfonate is in a range of about 65 to about 85 wt %. In some instances, the combined short chain alkyl benzene or alkyl naphthalene sulfonate is present in an amount of from about 70 to about 80 wt % by weight of the rinse aid composition. Short chain alkyl benzene or alkyl naphthalene sulfonates are commonly used as hydrotropes and are widely commercially available.

The rinse aid composition hardens into solid form due to the chemical reaction of the ingredients with the short chain alkyl benzene or alkyl naphthalene sulfonates. The solidification process may last from a few minutes to about four hours, depending, for example, on the size of the cast or extruded composition, the ingredients of the composition, the temperature of the composition, and other like factors. Pressed solids are also comtemplated, however for case or extruded solids, the rinse aid composition of the present disclosure exhibits extended mix time capability. Often, the cast or extruded composition "sets up" or begins to harden to a solid form within 1 minute to about 3 hours. For example, the cast or extruded composition "sets up" or begins to harden to a solid form within a range of 1 minute to 2 hours. In some instances, the cast or extruded composition "sets up" or begins to harden to a solid form with a range of 1 minute to about 20 minutes.

In some embodiments the solid rinse aid composition can include additional solidification agents in addition to the short chain alkyl benzene or alkyl naphthalene sulfonates. Examples of solidification agents include an amide such stearic monoethanolamide or lauric diethanolamide, or an alkylamide, and the like; a solid polyethylene glycol, or a solid EO/PO block copolymer, urea and the like; starches that have been made water-soluble through an acid or alkaline treatment process; various inorganics that impart solidifying properties to a heated composition upon cooling, and the like. Such compounds may also vary the solubility of the composition in an aqueous medium during use such that the rinse aid and/or other active ingredients may be dispensed from the solid composition over an extended period of time. The composition may include a secondary hardening agent in an amount in the range of up to about 10 wt %. In some embodiments, secondary hardening agents are may be present in an amount in the range of 0-10 wt %, often in the range of 10 to 5 wt % and sometimes in the range of about 0 to about 0.5 wt-%.

Water

The solid rinse aid composition includes water. Water many be independently added to the solid rinse aid composition or may be provided in the solid rinse aid composition as a result of its presence in an aqueous material that is added to the solid rinse aid composition. For example, materials added to the solid rinse aid composition include water or may be prepared in an aqueous premix available for reaction with the solidification agent component(s). Typically, water is introduced into the solid rinse aid composition to provide the composition with a desired viscosity prior to solidification, and to provide a desired rate of solidification.

In general, it is expected that water may be present as a processing aid and may be removed or become water of hydration. It is expected that water may be present in the solid composition. In the solid composition, it is expected that the water will be present in the solid rinse aid composition in the range of between 0 wt. % and 5 wt. %. For example, water is present in embodiments of the solid rinse aid composition in the range of between 0.1 wt. % to about 5 wt. %, or further embodiments in the range of between 0.5 wt. % and about 4 wt. %, or yet further embodiments in the range of between 1 wt. % and 3 wt. %. It should be additionally appreciated that the water may be provided as deionized water or as softened water.

The components used to form the solid composition can include water as hydrates or hydrated forms of the binding agent, hydrates or hydrated forms of any of the other ingredients, and/or added aqueous medium as an aid in processing. It is expected that the aqueous medium will help provide the components with a desired viscosity for processing. In addition, it is expected that the aqueous medium may help in the solidification process when is desired to form the concentrate as a solid.

Sheeting Agent

The solid rinse aid composition includes sheeting agent. The sheeting agent of the solid rinse aid composition includes an effective amount of one or more alcohol ethoxylate compounds. Typically, the sheeting agent of the solid rinse aid composition includes an effective amount of one or more alcohol ethoxylate compounds that include an alkyl group that has 12 or fewer carbon atoms. Typically, the blend of one or more alcohol ethoxylate compounds in the sheeting agent is a solid at room temperature, for example by having a melting point equal to or greater than 100° F., often greater than 110° F., and frequently in the range of 110° F. to 120° F. In at least some embodiments, alcohol ethoxylate compounds may each independently have structure represented by Formula I:

$$R—O—(CH_2CH_2O)_n—H \quad (I)$$

wherein R is a ($C_1$-$C_{12}$) alkyl group and n is an integer in the range of 1 to 100. In some embodiments, R may be a ($C_8$-$C_{12}$) alkyl group, or may be a ($C_8$-$C_{10}$) alkyl group. Similarly, in some embodiments, n is an integer in the range of 10-50, or in the range of 15-30, or in the range of 20-25. In some embodiments, the one or more alcohol ethoxylate compounds are straight chain hydrophobes.

In at least some embodiments, the sheeting agent includes at least two different alcohol ethoxylate compounds each having structure represented by Formula I. In other words, the R and/or n variables of Formula I, or both, may be different in the two or more different alcohol ethoxylate compounds present in the sheeting agent. For example, the sheeting agent in some embodiments may include a first alcohol ethoxylate compound in which R is a ($C_8$-$C_{10}$) alkyl group, and a second alcohol ethoxylate compound in which R is a ($C_{10}$-$C_{12}$) alkyl group. In at least some embodiments, the sheeting agent does not include any alcohol ethoxylate compounds that include an alkyl group that has more than 12 carbon atoms. In some embodiments, the sheeting agent includes only alcohol ethoxylate compounds that include an alkyl group that has 12 or fewer carbon atoms.

In some embodiments where, for example, the sheeting agent includes at least two different alcohol ethoxylate compounds, the ratio of the different alcohol ethoxylate compounds can be varied to achieve the desired characteristics of the final composition. For example, in some embodiments including a first alcohol ethoxylate compound and a second alcohol ethoxylate compound, the ratio of weight-percent first alcohol ethoxylate compound to weight-percent second compound may be in the range of about 1:1 to about 10:1 or more. For example, in some embodiments, the sheeting agent can include in the range of about 50% weight percent or more of the first compound, and in the range of about 50 weight percent or less of the second compound, and/or in the range of about 75 weight percent or more of the first compound, and in the range of about 25 weight percent or less of the second compound, and/or in the range of about 85 weight percent or more of the first compound, and in the range of about 15 weight percent or less of the second compound. Similarly, the range of mole ratio of the first compound to the second compound may be about 1:1 to about 10:1, and in some embodiments, in the range of about 3:1 to about 9:1.

In some embodiments, the alcohol ethoxylates used in the sheeting agent can be chosen such that they have certain characteristics, for example, are environmentally friendly, are suitable for use in food service industries, and/or the like. For example, the particular alcohol ethoxylates used in the sheeting agent may meet environmental or food service regulatory requirements, for example, biodegradability requirements.

Some specific examples of suitable sheeting agents that may be used include an alcohol ethoxylate combination including a first alcohol ethoxylate wherein R is a $C_{10}$ alkyl group and n is 21 (i.e. 21 moles ethylene oxide) and a second alcohol ethoxylate wherein R is a $C_{12}$ alkyl group and again, n is 21 (i.e. 21 moles ethylene oxide). Such a combination can be referred to as an alcohol ethoxylate $C_{10-12}$, 21 moles EO. In some particular embodiments, the sheeting agent may include in the range of about 85 wt. % or more of the $C_{10}$ alcohol ethoxylate and about 15 wt. % or less of the $C_{12}$ alcohol ethoxylate. For example, the sheeting agent may include in the range of about 90 wt. % of the $C_{10}$ alcohol ethoxylate and about 10 wt. % of the $C_{12}$ alcohol ethoxylate. One example of such an alcohol ethoxylate mixture is commercially available from Sasol under the tradename NOVEL II 1012-21. Alcohol ethoxylate surfactants are also described in U.S. Pat. No. 7,279,455, assigned to Ecolab, herein incorporated by reference.

The sheeting agent can comprise a very broad range of weight percent of the entire composition, depending upon the desired properties. For example, for concentrated embodiments, the sheeting agent can comprise in the range of 5 to about 35 wt. % of the total composition, in some embodiments in the range of about 10 to about 30 wt. % of the total composition, in some embodiments in the range of about 15 to about 25 wt. % of the total composition. For some diluted or use solutions, for example, aqueous use solutions, the sheeting agent can comprise in the range of 5 to about 60 ppm of the total use solution, in some embodiments in the range of about 50 to about 150 ppm of the total use solution, in some embodiments in the range of about 100 to about 250 ppm of the total use solution, and in some embodiments in the range of about 200 to about 500 ppm of the total use solution.

In some embodiments the sheeting agent can form part of a surfactant package. The surfactant package can comprise a sheeting agent present at about 1 wt % to about 10 wt %. In other embodiments, the sheeting agent is present at about 2 wt % to about 5 wt %. In still yet other embodiments, the defoaming agent is present at about 1 wt % to about 10 wt %. 1

Defoamer Component

The rinse aid composition can also include a surfactant package that includes an effective amount of defoamer component configured for reducing the stability of foam that may be created by the alcohol ethoxylate sheeting agent in an aqueous solution. Any of a broad variety of suitable defoamers may be used, for example, any of a broad variety of nonionic ethylene oxide (EO) containing surfactants. Many nonionic ethylene oxide derivative surfactants are water soluble and have cloud points below the intended use temperature of the rinse aid composition, and therefore may be useful defoaming agents. In addition, where the solid rinse aid composition is preferred to be biodegradable, the defoamers are also selected to be biodegradable.

While not wishing to be bound by theory, it is believed that suitable nonionic EO containing surfactants are hydrophilic and water soluble at relatively low temperatures, for example, temperatures below the temperatures at which the rinse aid will be used. It is theorized that the EO component forms hydrogen bonds with the water molecules, thereby solubilizing the surfactant. However, as the temperature is increased, these hydrogen bonds are weakened, and the EO containing surfactant becomes less soluble, or insoluble in water. At some point, as the temperature is increased, the cloud point is reached, at which point the surfactant precipitates out of solution, and functions as a defoamer. The surfactant can therefore act to defoam the sheeting agent component when used at temperatures at or above this cloud point.

The cloud point of nonionic surfactant of this class is defined as the temperature at which a 1 wt-% aqueous solution. Therefore, the surfactant and/or surfactants chosen for use in the defoamer component can include those having appropriate cloud points that are below the intended use temperature of the rinse aid. Those of skill and the art, knowing the intended use temperature of the rinse aid, will appreciate surfactants with appropriate cloud points for use as defoamers.

For example, there are two general types of rinse cycles in commercial warewashing machines. A first type of rinse cycle can be referred to as a hot water sanitizing rinse cycle because of the use of generally hot rinse water (about 180° F.). A second type of rinse cycle can be referred to as a chemical sanitizing rinse cycle and it uses generally lower temperature rinse water (about 120° F.). A surfactant useful as a defoamer in these two conditions is one having a cloud point less than the rinse water temperature. Accordingly, in this example, the highest useful cloud point, measured using a 1 wt-% aqueous solution, for the defoamer is approximately 180° F. or less. It should be understood, however, that the cloud point can be lower or higher, depending on the use locus water temperature. For example, depending upon the use locus water temperature, the cloud point may be in the range of about 0 to about 100° C. Some examples of common suitable cloud points may be in the range of about 50° C. to about 80° C., or in the range of about 60° C. to about 70° C.

Some examples of ethylene oxide derivative surfactants that may be used as defoamers include polyoxyethylene-polyoxypropylene block copolymers, alcohol alkoxylates, low molecular weight EO containing surfactants, or the like, or derivatives thereof. Some examples of polyoxyethylene-polyoxypropylene block copolymers include those having the following formulae:

$(EO)_x(PO)_y(EO)_x$ $(PO)_y(EO)_x(PO)_y$ $(PO)_y(EO)_x(PO)_y(EO)_x(PO)_y$

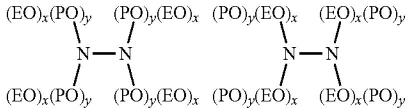

wherein EO represents an ethylene oxide group, PO represents a propylene oxide group, and x and y reflect the average molecular proportion of each alkylene oxide monomer in the overall block copolymer composition. In some embodiments, x is in the range of about 10 to about 130, y is in the range of about 15 to about 70, and x plus y is in the range of about 25 to about 200. It should be understood that each x and y in a molecule can be different. In some embodiments, the total polyoxyethylene component of the block copolymer can be in the range of at least about 20 mol-% of the block copolymer and in some embodiments, in the range of at least about 30 mol-% of the block copolymer. In some embodiments, the material can have a molecular weight greater than about 400, and in some embodiments, greater than about 500. For example, in some embodiments, the material can have a molecular weight in the range of about 500 to about 7000 or more, or in the range of about 950 to about 4000 or more, or in the range of about 1000 to about 3100 or more, or in the range of about 2100 to about 6700 or more.

Although the exemplary polyoxyethylene-polyoxypropylene block copolymer structures provided above have 3-8 blocks, it should be appreciated that the nonionic block copolymer surfactants can include more or less than 3 or 8 blocks. In addition, the nonionic block copolymer surfactants can include additional repeating units such as butylene oxide repeating units. Furthermore, the nonionic block copolymer surfactants that can be used according to the invention can be characterized hetero-polyoxyethylene-polyoxypropylene block copolymers. Some examples of suitable block copolymer surfactants include commercial products such as PLURONIC® and TETRONIC® surfactants, commercially available from BASF. For example, PLURONIC® 25R2 is one example of a useful block copolymer surfactant commercially available from BASF, that is biodegradable and GRAS (generally recognized as safe).

It is believed that one skilled in the art would understand that a nonionic surfactant with an unacceptably high cloud point temperature or an unacceptably high molecular weight would either produce unacceptable foaming levels or fail to provide adequate defoaming capacity in a rinse aid composition.

The defoamer component can comprise a very broad range of weight percent of the entire composition, depending upon the desired properties. For example, for concentrated embodiments, the defoamer component can comprise in the range of 1 to about 10 wt. % of the total composition, in some embodiments in the range of about 5 to about 25 wt. % of the total composition, in some embodiments in the range of about 20 to about 50 wt. % of the total composition, and in some embodiments in the range of about 40 to about 90 wt. % of the total composition. For some diluted or use solutions, the defoamer component can comprise in the range of 5 to about 60 ppm of the total use solution, in some embodiments in the range of about 50 to about 150 ppm of the total use solution, in some embodiments in the range of about 100 to about 250 ppm of the total use solution, and in some embodiments in the range of about 200 to about 500 ppm of the use solution.

In still yet other embodiments, the defoaming agent is present as a part of an surfactant package at about 1 wt % to about 20% In still yet other embodiments, the surfactant system includes a defoaming agent present at about 2 wt % to about 5 wt % of the surfactant component.

The amount of defoamer component present in the composition can also be dependent upon the amount of sheeting agent present in the composition. For example, the less sheeting agent present in the composition may provide for the use of less defoamer component. In some example embodiments, the ratio of weight-percent sheeting agent component to weight-percent defoamer component may be in the range of about 1:5 to about 5:1, or in the range of about 1:3 to about 3:1. Those of skill in the art will recognize that the ratio of sheeting agent component to defoamer component may be dependent on the properties of either and/or both actual components used, and these ratios may vary from the example ranges given to achieve the desired defoaming effect. Defoamer components are also described in U.S. Pat. No. 7,279,455, assigned to Ecolab, herein incorporated by reference.

Association Disruption Agent

In some aspects, the rinse aid composition can also include one or more association disruption agents. Association disruption agents suitable for use in the compositions of the present invention include surfactants that are capable of altering, e.g., interrupting, the association of the other active agents, e.g., sheeting and defoaming agents, included in the rinse aids of the present invention.

In some embodiments, the association disruption agents included in the rinse aid compositions of the present invention reduce the contact angle of the rinse aid compositions. For example, in some embodiments, the association disruption agents reduce the contact angle of the rinse aid compositions by about 5°, about 10°, or by about 15°. Without wishing to be bound by any particular theory, it is thought that the lower the contact angle, the more a composition will induce sheeting. That is, compositions with lower contact angles will form droplets on a substrate with a larger surface area than compositions with higher contact angles. The increased surface area results in a faster drying time, with fewer spots formed on the substrate.

A variety of disruption association agents can be used in the rinse aid compositions of the present invention. In some embodiments, the association disruption agent includes an alcohol alkoxylate. In some embodiments, the alcohol alkoxylate includes a polyoxyethylene-polyoxypropylene copolymer surfactant (an "alcohol EO/PO surfactant"). The alcohol EO/PO surfactant can include a compact alcohol EO/PO surfactant where the EO and PO groups are in small block form, or random form. In other embodiments, the alcohol alkoxylate includes an ethylene oxide, a propylene oxide, a butylene oxide, a pentylene oxide, a hexylene oxide, a heptylene oxide, an octylene oxide, a nonylene oxide, a decylene oxide, and mixtures thereof. In some embodiments, the one or more association disruption agent includes a C12-C14 fatty alcohol EO/PO surfactant.

Exemplary commercially available association disruption agents include, but are not limited to, Genapol EP-2454® (commercially available from Clariant), Plurafac LF-221® (commercially available from BASF), Plurafac LF-500® (commercially available from BASF), and Dehypon® LS-54 (commercially available from Cognis).

In some embodiments, the rinse aid compositions of the present invention include one or more disruption association agent. In other embodiments, the rinse aid compositions of the present invention include at least two, at least three or at least four association disruption agents.

The association disruption agents can be present in the rinse aid compositions at between about 1 wt % to about 25 wt % of the total composition. In some embodiments, the disruption association agent is present in the rinse aid composition at between about 10 wt % to about 20 wt %. In other embodiments, the disruption association agent is present in the rinse aid composition at about 15 wt %.

In some embodiments, the surfactant system with one or more association disruption agent is present at between about 1 wt % to about 25 wt % of the surfactant system. In other embodiments, the one or more disruption agent is present at between about 10 wt % to about 20 wt % of the surfactant system.

In some embodiments the ratio of the sheeting agent, defoaming agent, and association disruption agent is selected so as to maximize the draining/drying time of the rinse aid compositions of the present invention. In some embodiments, the ratio of sheeting agent to defoaming agent to association disrupting agent is from about 1:1.5:30 to about 1:2:1. In some embodiments, the ratio of sheeting agent to defoaming agent to association disrupting agent is about 1:1.6:6.8. It is to be understood that all values and ranges between these values and ranges are encompassed by the present invention.

Additional Functional Materials

As indicated above, short chain alkyl benzene or alkyl naphthalene sulfonates and a surfactant (sheeting agent) or surfactant package can be used to form a solid rinse aid composition that may contain other functional materials, in addition to the sheeting agent component, the defoamer component, and the one or more disruption agents that provide the desired properties and functionality to the solid composition. Functional materials include a material that when dispersed or dissolved in a use solution, provides a beneficial property in a particular use. Examples of such a functional material include chelating/sequestering agents; bleaching agents or activators; sanitizers/anti-microbial agents; activators; builder or fillers; anti-redeposition agents; optical brighteners; dyes; odorants or perfumes; preservatives; stabilizers; processing aids; corrosion inhibitors; fillers; solidifiers; hardening agent; solubility modifiers; pH adjusting agents; humectants; hydrotropes; or a broad variety of other functional materials, depending upon the desired characteristics and/or functionality of the composition. In the context of some embodiments disclosed herein, the functional materials, or ingredients, are optionally included within the solidification matrix for their functional properties. Some more particular examples of functional materials are discussed in more detail below, but it should be understood by those of skill in the art and others that the particular materials discussed are given by way of example only, and that a broad variety of other functional materials may be used.

Preservatives

The solid rinse aid composition may also include effective amounts of preservatives. Often, overall acidity and/or acids in the solid rinse aid composition and the use solution serves a preservative and stabilizing function.

Some embodiments of the inventive solid rinse aid composition also include a GRAS preservative system for acidification of the solid rinse aid including sodium bisulfate and organic acids. In at least some embodiments, the solid rinse aid has pH of 2.0 or less and the use solution of the solid rinse aid has a pH of at least pH 4.0. Typically, sodium bisulfate is included in the solid rinse aid composition as an acid source. In certain embodiments, an effective amount of sodium bisulfate and one or more other acids are included in the solid rinse aid composition as a preservative system. Suitable acids include for example, inorganic acids, such as HCl and organic acids. In certain further embodiments, an effective amount of sodium bisulfate and one or more organic acids are included in the solid rinse aid composition as a preservative system. Suitable organic acids include sorbic acid, benzoic acid, ascorbic acid, erythorbic acid, citric acid, etc. . . . . Preferred organic acids include benzoic and ascorbic acid. Generally, effective amounts of sodium bisulfate with or without additional acids are included such that a use solution of the solid rinse aid composition has a pH that shall be less than pH 4.0, often less pH 3.0, and may be even less than pH 2.0.

In other embodiments, the solid rinse aid composition includes sanitizers/anti-microbial agents, in addition to or in alternative the preservative system described above. Suitable sanitizers/anti-microbial agents are described below.

The preservative component may be present in the rinse aid composition in an amount of from about In certain embodiments the preservative composition includes sodium bisulfate present in an amount of from 60 wt % to about 99 wt %, and the acids are each present in an amount from about 0.5 wt % to about 20 wt % each. In a more preferred embodiment the sodium bisulfate present in an amount of from 70 wt % to about 95 wt %, and the acids are each present in an amount from about 2.5 wt % to about 15 wt % each and in an even more preferred embodiment the sodium bisulfate is present in an amount of from 80 wt % to about 90 wt %, and the acids are each present in an amount from about 5 wt % to about 10 wt % each, with any remainder being water or other suitable carrier. In an embodiment the sodium bisulfate is present in an amount of 85 wt % and the acids are each present in an amount of 7.5 wt % each. The preservative component, if present is typically an amount of the solid rinse aid component in an amount of from about 0.1 to 20 wt % preferably 1 to 15 wt % and most preferably 1 wt % to about 10 wt %.

Chelating/Sequestering Agents

The solid rinse aid composition may also include effective amounts of sodium sulfate and sodium bisulfate to function as chelating/sequestering agents, also referred to as builders.

In addition, the rinse aid may optionally include one or more additional builders as a functional ingredient. In general, a chelating agent is a molecule capable of coordinating (i.e., binding) the metal ions commonly found in water sources to prevent the metal ions from interfering with the action of the other ingredients of a rinse aid or other cleaning composition. The chelating/sequestering agent may also function as a threshold agent when included in an effective amount. In some embodiments, a solid rinse aid can include in the range of up to about 70 wt. %, or in the range of about 1-60 wt. %, of a chelating/sequestering agent.

Often, the solid rinse aid composition is also phosphate-free and/or amino-carboxylate-free. In embodiments of the solid rinse aid composition that are phosphate-free, the additional functional materials, including builders exclude phosphorous-containing compounds such as condensed phosphates and phosphonates.

Suitable additional builders include polycarboxylates. Some examples of polymeric polycarboxylates suitable for use as sequestering agents include those having a pendant carboxylate (—$CO_2$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

In embodiments of the solid rinse aid composition which are not aminocarboxyate-free may include added chelating/sequestering agents which are aminocarboxylates. Some examples of aminocarboxylic acids include, N-hydroxyethyliminodiacetic acid, nitrilotriacetic acid (NTA), ethylenediaminetetraacetic acid (EDTA), N-hydroxyethyl-ethylenediaminetriacetic acid (HEDTA) (in addition to the HEDTA used in the binder), diethylenetriaminepentaacetic acid (DTPA), and the like.

In embodiments of the solid rinse aid composition which are not phosphate-free, added chelating/sequestering agents may include, for example a condensed phosphate, a phosphonate, and the like. Some examples of condensed phosphates include sodium and potassium orthophosphate, sodium and potassium pyrophosphate, sodium tripolyphosphate, sodium hexametaphosphate, and the like. A condensed phosphate may also assist, to a limited extent, in solidification of the composition by fixing the free water present in the composition as water of hydration.

In embodiments of the solid rinse aid composition which are not phosphate-free, the composition may include a phosphonate such as 1-hydroxyethane-1,1-diphosphonic acid $CH_3C(OH)[PO(OH)_2]_2$; aminotri(methylenephosphonic acid) $N[CH_2PO(OH)_2]_3$; aminotri(methylenephosphonate), sodium salt

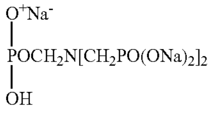

2-hydroxyethyliminobis(methylenephosphonic acid) $HOCH_2CH_2N[CH_2PO(OH)_2]_2$; diethylenetriaminepenta(methylenephosphonic acid) $(HO)_2POCH_2N[CH_2CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene) triamine(pentamethylenephosphonic acid) $(HO_2)POCH_2N[(CH_2)_6N[CH_2PO(OH)_2]_2]_2$; and phosphorus acid $H_3PO_3$. In some embodiments, a phosphonate combination such as ATMP and DTPMP may be used. A neutralized or alkaline phosphonate, or a combination of the phosphonate with an alkali source prior to being added into the mixture such that there is little or no heat or gas generated by a neutralization reaction when the phosphonate is added can be used.

For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Bleaching Agents

The rinse aid can optionally include bleaching agent. Bleaching agent can be used for lightening or whitening a substrate, and can include bleaching compounds capable of liberating an active halogen species, such as $Cl_2$, $Br_2$, —$OCl^-$ and/or —$OBr^-$, or the like, under conditions typically encountered during the cleansing process. Suitable bleaching agents for use can include, for example, chlorine-containing compounds such as a chlorine, a hypochlorite, chloramines, of the like. Some examples of halogen-releasing compounds include the alkali metal dichloroisocyanurates, chlorinated trisodium phosphate, the alkali metal hypochlorites, monochloramine and dichloroamine, and the like. Encapsulated chlorine sources may also be used to enhance the stability of the chlorine source in the composition (see, for example, U.S. Pat. Nos. 4,618,914 and 4,830,773, the disclosures of which are incorporated by reference herein). A bleaching agent may also include an agent containing or acting as a source of active oxygen. The active oxygen compound acts to provide a source of active oxygen, for example, may release active oxygen in aqueous solutions. An active oxygen compound can be inorganic or organic, or can be a mixture thereof. Some examples of active oxygen compound include peroxygen compounds, or peroxygen compound adducts. Some examples of active oxygen compounds or sources include hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. A rinse aid composition may include a minor but effective amount of a bleaching agent, for example, in some embodiments, in the range of up to about 10 wt. %, and in some embodiments, in the range of about 0.1 to about 6 wt. %.

Sanitizers/Anti-Microbial Agents

The rinse aid can optionally include a sanitizing agent. Sanitizing agents also known as antimicrobial agents are chemical compositions that can be used in a solid functional material to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

It should also be understood that active oxygen compounds, such as those discussed above in the bleaching agents section, may also act as antimicrobial agents, and can even provide sanitizing activity. In fact, in some embodiments, the ability of the active oxygen compound to act as an antimicrobial agent reduces the need for additional antimicrobial agents within the composition. For example, percarbonate compositions have been demonstrated to provide excellent antimicrobial action. Nonetheless, some embodiments incorporate additional antimicrobial agents.

The given antimicrobial agent, depending on chemical composition and concentration, may simply limit further proliferation of numbers of the microbe or may destroy all or a portion of the microbial population. The terms “microbes” and “microorganisms” typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Some examples of common antimicrobial agents include phenolic antimicrobials such as pentachlorophenol, orthophenylphenol, a chloro-p-benzylphenol, p-chloro-m-xylenol. Halogen containing antibacterial agents include sodium trichloroisocyanurate, sodium dichloro isocyanate (anhydrous or dihydrate), iodine-poly(vinylpyrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties. Example antimicrobial agents include a blend of methylchloroisothiazolinone and methylisothiazolinone, available from Rohm and Haas under the tradename KATHON.

In embodiments of the solid rinse aid composition which are phosphate-free, and/or aminocarboxylate-free, and also include an anti-microbial agent, the anti-microbial is selected to meet those requirements. Embodiments of the solid rinse aid composition which include only GRAS ingredients, may exclude or omit anti-microbial agents described in this section.

In some embodiments, the rinse aid composition comprises, an antimicrobial component, such as blends of methylchloroisothiazolinone and methylisothiazolinone, in the range of up to about 10% by wt. of the composition, in some embodiments in the range of up to about 5 wt. %, or in some embodiments, in the range of about 0.01 to about 3 wt. %, or in the range of 0.05 to 1% by wt of the composition.

Activators

In some embodiments, the antimicrobial activity or bleaching activity of the rinse aid can be enhanced by the addition of a material which, when the composition is placed in use, reacts with the active oxygen to form an activated component. For example, in some embodiments, a peracid or a peracid salt is formed. For example, in some embodiments, tetraacetylethylene diamine can be included within the composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof.

In some embodiments, an activator component can include in the range of up to about 75% by wt. of the composition, in some embodiments, in the range of about 0.01 to about 20% by wt, or in some embodiments, in the range of about 0.05 to 10% by wt of the composition. In some embodiments, an activator for an active oxygen compound combines with the active oxygen to form an antimicrobial agent.

In some embodiments, the rinse aid composition includes a solid, such as a solid flake, pellet, or block, and an activator material for the active oxygen is coupled to the solid. The activator can be coupled to the solid by any of a variety of methods for coupling one solid cleaning composition to another. For example, the activator can be in the form of a solid that is bound, affixed, glued or otherwise adhered to the solid of the rinse aid composition. Alternatively, the solid activator can be formed around and encasing the solid rinse aid composition. By way of further example, the solid activator can be coupled to the solid rinse aid composition by the container or package for the composition, such as by a plastic or shrink wrap or film.

Fillers

The rinse aid can optionally include a minor but effective amount of one or more of a filler which does not necessarily perform as a rinse and/or cleaning agent per se, but may cooperate with a rinse agent to enhance the overall capacity of the composition. Some examples of suitable fillers may include sodium chloride, starch, sugars, $C_1$-$C_{10}$ alkylene glycols such as propylene glycol, and the like. In some embodiments, a filler can be included in an amount in the range of up to about 20 wt. %, and in some embodiments, in the range of about 1-15 wt. %. Sodium sulfate is conventionally used as inert filler. However, surprisingly, sodium sulfate was found to function in solidification in combination with urea.

Anti-Redeposition Agents

The rinse aid composition can optionally include an anti-redeposition agent capable of facilitating sustained suspension of soils in a rinse solution and preventing removed soils from being redeposited onto the substrate being rinsed. Some examples of suitable anti-redeposition agents can include fatty acid amides, fluorocarbon surfactants, complex phosphate esters, styrene maleic anhydride copolymers, and cellulosic derivatives such as hydroxyethyl cellulose, hydroxypropyl cellulose, and the like. A rinse aid composition may include up to about 10 wt. %, and in some embodiments, in the range of about 1 to about 5 wt. %, of an anti-redeposition agent.

Dyes/Odorants

Various dyes, odorants including perfumes, and other aesthetic enhancing agents may also be included in the rinse aid. Dyes may be included to alter the appearance of the composition, as for example, FD&C Blue 1 (Sigma Chemical), FD&C Yellow 5 (Sigma Chemical), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as C1S-jasmine or jasmal, vanillin, and the like.

Additional Sheeting Aids

The composition can optionally include one or more additional rinse aid components, for example, an additional wetting or sheeting agent components in addition to the alcohol ethoxylate component discussed above. For example, water soluble or dispersible low foaming organic material capable of aiding in reducing the surface tension of the rinse water to promote sheeting action and/or to aid in reducing or preventing spotting or streaking caused by beaded water after rinsing is complete may also be included. Such sheeting agents are typically organic surfactant like materials having a characteristic cloud point. Surfactants useful in these applications are aqueous soluble surfactants having a cloud point greater than the available hot service water, and the cloud point can vary, depending on the use locus hot water temperature and the temperature and type of rinse cycle.

Some examples of additional sheeting agents can typically comprise a polyether compound prepared from ethylene oxide, propylene oxide, or a mixture in a homopolymer or block or hetero-copolymer structure. Such polyether compounds are known as polyalkylene oxide polymers, polyoxyalkylene polymers or polyalkylene glycol polymers. Such sheeting agents require a region of relative hydrophobicity and a region of relative hydrophilicity to provide surfactant properties to the molecule. Such sheeting agents can have a molecular weight in the range of about 500 to 15,000. Certain types of (PO)(EO) polymeric rinse aids have been found to be useful containing at least one block of poly(PO) and at least one block of poly(EO) in the polymer molecule. Additional blocks of poly(EO), poly (PO) or random polymerized regions can be formed in the molecule. Particularly useful polyoxypropylene polyoxyethylene block copolymers are those comprising a center block of polyoxypropylene units and blocks of polyoxyethylene units to each side of the center block. Such polymers have the formula shown below:

$$(EO)_n—(PO)_m-(EO)_n.$$

wherein m is an integer of 20 to 60, and each end is independently an integer of 10 to 130. Another useful block copolymer are block copolymers having a center block of polyoxyethylene units and blocks of polyoxypropylene to each side of the center block. Such copolymers have the formula:

$$(PO)_n-(EO)_m—(PO)_n.$$

wherein m is an integer of 15 to 175, and each end are independently integers of about 10 to 30. For solid compositions, a hydrotrope may be used to aid in maintaining the solubility of sheeting or wetting agents. Hydrotropes can be used to modify the aqueous solution creating increased solubility for the organic material. In some embodiments, hydrotropes are low molecular weight aromatic sulfonate materials such as xylene sulfonates and dialkyldiphenyl oxide sulfonate materials.

Functional Polydimethylsiloxones

The composition can also optionally include one or more functional polydimethylsiloxones. For example, in some embodiments, a polyalkylene oxide-modified polydimethylsiloxane, nonionic surfactant or a polybetaine-modified polysiloxane amphoteric surfactant can be employed as an additive. Both, in some embodiments, are linear polysiloxane copolymers to which polyethers or polybetaines have been grafted through a hydrosilation reaction. Some examples of specific siloxane surfactants are known as SILWET® surfactants available from Union Carbide or ABIL® polyether or polybetaine polysiloxane copolymers available from Goldschmidt Chemical Corp., and described in U.S. Pat. No. 4,654,161 which patent is incorporated herein by reference. In some embodiments, the particular siloxanes used can be described as having, e.g., low surface tension, high wetting ability and excellent lubricity. For example, these surfactants are said to be among the few capable of wetting polytetrafluoroethylene surfaces. The siloxane surfactant employed as an additive can be used alone or in combination with a fluorochemical surfactant. In some embodiments, the fluorochemical surfactant employed as an additive optionally in combination with a silane, can be, for example, a nonionic fluorohydrocarbon, for example, fluorinated alkyl polyoxyethylene ethanols, fluorinated alkyl alkoxylate and fluorinated alkyl esters.

Further description of such functional polydimethylsiloxones and/or fluorochemical surfactants are described in U.S. Pat. Nos. 5,880,088; 5,880,089; and 5,603,776, all of which patents are incorporated herein by reference. We have found, for example, that the use of certain polysiloxane copolymers in a mixture with hydrocarbon surfactants provide excellent rinse aids on plasticware. We have also found that the combination of certain silicone polysiloxane copolymers and fluorocarbon surfactants with conventional hydrocarbon surfactants also provide excellent rinse aids on plasticware. This combination has been found to be better than the individual components except with certain polyalkylene oxide-modified polydimethylsiloxanes and polybetaine polysiloxane copolymers, where the effectiveness is about equivalent. Therefore, some embodiments encompass the polysiloxane copolymers alone and the combination with the fluorocarbon surfactant can involve polyether polysiloxanes, the nonionic siloxane surfactants. The amphoteric siloxane surfactants, the polybetaine polysiloxane copolymers may be employed alone as the additive in the rinse aids to provide the same results.

In some embodiments, the composition may include functional polydimethylsiloxones in an amount in the range of up to about 10 wt-%. For example, some embodiments may include in the range of about 0.1 to 10 wt-% of a polyalkylene oxide-modified polydimethylsiloxane or a polybetaine-modified polysiloxane, optionally in combination with about 0.1 to 10 wt-% of a fluorinated hydrocarbon nonionic surfactant.

Humectant

The composition can also optionally include one or more humectants. A humectant is a substance having an affinity for water. The humectant can be provided in an amount sufficient to aid in reducing the visibility of a film on the substrate surface. The visibility of a film on substrate surface is a particular concern when the rinse water contains in excess of 200 ppm total dissolved solids. Accordingly, in some embodiments, the humectant is provided in an amount sufficient to reduce the visibility of a film on a substrate surface when the rinse water contains in excess of 200 ppm total dissolved solids compared to a rinse agent composition not containing the humectant. The terms "water solids filming" or "filming" refer to the presence of a visible, continuous layer of matter on a substrate surface that gives the appearance that the substrate surface is not clean.

Some example humectants that can be used include those materials that contain greater than 5 wt. % water (based on dry humectant) equilibrated at 50% relative humidity and room temperature. Exemplary humectants that can be used include glycerin, propylene glycol, sorbitol, alkyl polyglycosides, polybetaine polysiloxanes, and mixtures thereof. In some embodiments, the rinse agent composition can include humectant in an amount in the range of up to about 75% based on the total composition, and in some embodiments, in the range of about 5 wt. % to about 75 wt. % based on the weight of the composition. In some embodiments, where humectant is present, the weight ratio of the humectant to the sheeting agent can be in the range of about 1:3 or greater, and in some embodiments, in the range of about 5:1 and about 1:3.

Other Ingredients

A wide variety of other ingredients useful in providing the particular composition being formulated to include desired properties or functionality may also be included. For example, the rinse aid may include other active ingredients, such as pH modifiers, buffering agents, cleaning enzyme, carriers, processing aids, or others, and the like.

Additionally, the rinse aid can be formulated such that during use in aqueous operations, for example in aqueous cleaning operations, the rinse water will have a desired pH. For example, compositions designed for use in rinsing may be formulated such that during use in aqueous rinsing operation the rinse water will have a pH in the range of about 3 to about 5, or in the range of about 5 to about 9. Liquid product formulations in some embodiments have a (10% dilution) pH in the range of about 2 to about 4. Techniques for controlling pH at recommended usage levels include the use of buffers, alkali, acids, etc., and are well known to those skilled in the art.

Processing and/or Manufacturing of the Composition

The invention also relates to a method of processing and/or making the solid rinse aid composition. The solid rinse aid composition is generally provided as a solid concentrate, e.g., block. In general, it is expected that the solid rinse aid composition will be diluted with water to provide the use solution that is then supplied to the surface of a substrate, for example, during a rinse cycle. The use solution preferably contains an effective amount of active material to provide reduced water solids filming in high solids containing water.

A solid cleaning or rinsing composition as used in the present disclosure encompasses a variety of forms including, for example, solids, pellets, blocks, and tablets, but not powders. It should be understood that the term "solid" refers to the state of the composition under the expected conditions of storage and use of the solid rinse aid composition. In general, it is expected that the rinse aid composition will remain a solid when provided at a temperature of up to about 100° F. or greater than 120° F.

It should be understood that compositions and methods embodying the invention are suitable for preparing a variety of solid compositions, as for example, a cast, extruded, molded or formed solid pellet, block, tablet, pressed solid and the like. In some embodiments, the solid composition can be formed to have a weight of 50 grams or less, while in other embodiments, the solid composition can be formed to have a weight of 50 grams or greater, 500 grams or greater, or 1 kilogram or greater. For the purpose of this application the term "solid block" includes cast, pressed, formed, or extruded materials having a weight of 50 grams or greater. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use.

The solid rinse aid composition can be processed and formulated using conventional equipment and techniques. The desired amount of the short chain alkyl benzene or alkyl naphthalene sulfonates and surfactant system, and any other optional ingredients, such as one or more additional solidification agents are vigorously admixed and heated, typically in the range of 100 to 140° F. The vigorous admixing and heating may be performed in a TEKMAR mixer or an extruder system or other similar equipment. The complete mixture is subsequently extruded into the desired form or cast into a mold, cooled or chilled. Molded forms may be removed from the molds or remain in the container (i.e. mold).

According to the present invention, a solid rinse aid composition can also be prepared by a method including: providing a powder or crystalline form of the rinse aid composition; gently pressing the composition to form a solid (e.g., block or puck).

In certain embodiments, the solid cleaning composition is provided in the form of a unit dose. A unit dose refers to a solid rinse composition unit sized so that the entire unit is used during a single washing/rinse cycle. When the solid cleaning composition is provided as a unit dose, it can have a mass of about 1 g to about 50 g. In other embodiments, the composition can be a solid, a pellet, or a tablet having a size of about 50 g to 250 g, of about 100 g or greater, or about 40 g to about 11,000 g.

In other embodiments, the solid cleaning composition is provided in the form of a multiple-use solid, such as, a block or a plurality of pellets, and can be repeatedly used to generate aqueous rinse compositions for multiple washing cycles. In certain embodiments, the solid cleaning composition is provided as a solid having a mass of about 5 g to 10 kg. In certain embodiments, a multiple-use form of the solid rinse aid composition has a mass of about 1 to 10 kg. In further embodiments, a multiple-use form of the solid rinse aid composition has a mass of about 5 kg to about 8 kg. In other embodiments, a multiple-use form of the solid cleaning composition has a mass of about 5 g to about 1 kg, or about 5 g and to 500 g.

If applicable, various liquid materials included in the rinse aid composition are adapted to a solid form by incorporating into the composition short chain alkyl benzene or alkyl naphthalene sulfonates, optionally accompanied by one or more organic and inorganic solidifying materials such as urea or PEG and the like. Other examples of casting agents include nonionic polyethylene or polypropylene oxide polymer. In some embodiments, polyethylene glycols (PEG) are used in melt type solidification processing by uniformly blending the sheeting agent and other components with PEG at a temperature above the melting point of the PEG and cooling the uniform mixture.

In some embodiments, in the formation of a solid composition, a mixing system may be used to provide for continuous mixing of the ingredients at high enough shear to form a substantially homogeneous solid or semi-solid mixture in which the ingredients are distributed throughout its mass. In some embodiments, the mixing system includes means for mixing the ingredients to provide shear effective for maintaining the mixture at a flowable consistency, with a viscosity during processing in the range of about 1,000-1,000,000 cP, or in the range of about 50,000-200,000 cP. In some example embodiments, the mixing system can be a continuous flow mixer or in some embodiments, an extruder, such as a single or twin screw extruder apparatus. A suitable amount of heat may be applied from an external source to facilitate processing of the mixture.

The mixture is typically processed at a temperature to maintain the physical and chemical stability of the ingredients. In some embodiments, the mixture is processed at temperatures in the range of about 100 to 140° F. In certain other embodiments, the mixture is processed at temperatures in the range of 110-125° F. Although limited external heat may be applied to the mixture, the temperature achieved by the mixture may become elevated during processing due to friction, variances in ambient conditions, and/or by an exothermic reaction between ingredients. Optionally, the temperature of the mixture may be increased, for example, at the inlets or outlets of the mixing system.

An ingredient may be in the form of a liquid or a solid such as a dry particulate, and may be added to the mixture separately or as part of a premix with another ingredient, as for example, a sheeting agent, a defoamer, an aqueous medium, and additional ingredients such as a hardening agent, and the like. One or more premixes may be added to the mixture.

The ingredients are mixed to form a substantially homogeneous consistency wherein the ingredients are distributed substantially evenly throughout the mass. The mixture can be discharged from the mixing system through a die or other shaping means. The profiled extrudate then can be divided into useful sizes with a controlled mass. Optionally, heating and cooling devices may be mounted adjacent to mixing apparatus to apply or remove heat in order to obtain a desired temperature profile in the mixer. For example, an external source of heat may be applied to one or more barrel sections of the mixer, such as the ingredient inlet section, the final outlet section, and the like, to increase fluidity of the mixture during processing. In some embodiments, the temperature of the mixture during processing, including at the discharge port, is maintained in the range of about 100 to 140° F.

The composition hardens due to the chemical or physical reaction of the requisite ingredients forming the solid. The solidification process may last from a few minutes to about six hours, or more, depending, for example, on the size of the cast or extruded composition, the ingredients of the composition, the temperature of the composition, and other like factors. In some embodiments, the cast or extruded composition "sets up" or begins to hardens to a solid form within about 1 minute to about 3 hours, or in the range of about 1 minute to about 2 hours, or in some embodiments, within about 1 minute to about 20 minutes. The solid may also be a pressed solid formulation.

Packaging System

In some embodiments, the solid can be packaged, for example in a container or in film. The temperature of the mixture when discharged from the mixing system can be sufficiently low to enable the mixture to be cast or extruded directly into a packaging system without first cooling the mixture. The time between extrusion discharge and packaging may be adjusted to allow the hardening of the composition for better handling during further processing and packaging. In some embodiments, the mixture at the point of discharge is in the range of about 100 to 140° F. In certain other embodiments, the mixture is processed at temperatures in the range of 110-125° F. The composition is then allowed to harden to a solid form that may range from a low density, sponge-like, malleable, caulky consistency to a high density, fused solid, concrete-like solid.

The solid rinse aid composition can be, but is not necessarily, incorporated into a packaging system or receptacle. The packaging receptacle or container may be rigid or flexible, and include any material suitable for containing the compositions produced, as for example glass, metal, plastic film or sheet, cardboard, cardboard composites, paper, or the like. Rinse aid compositions may be allowed to solidify in the packaging or may be packaged after formation of the solids in commonly available packaging and sent to distribution center before shipment to the consumer.

For solids, advantageously, in at least some embodiments, since the rinse is processed at or near ambient temperatures, the temperature of the processed mixture is low enough so that the mixture may be cast or extruded directly into the container or other packaging system without structurally damaging the material. As a result, a wider variety of materials may be used to manufacture the container than those used for compositions that processed and dispensed under molten conditions. In some embodiments, the packaging used to contain the rinse aid is manufactured from a flexible, easy opening film material.

Dispensing/Use of the Rinse Aid

The rinse aid can be dispensed as a concentrate or as a use solution. In addition, the rinse aid concentrate can be provided in a solid form or in a liquid form. In general, it is expected that the concentrate will be diluted with water to provide the use solution that is then supplied to the surface of a substrate. In some embodiments, the aqueous use solution may contain about 2,000 parts per million (ppm) or less active materials, or about 1,000 ppm or less active material, or in the range of about 10 ppm to about 500 ppm of active materials, or in the range of about 10 to about 300 ppm, or in the range of about 10 to 200 ppm.

The use solution can be applied to the substrate during a rinse application, for example, during a rinse cycle, for example, in a warewashing machine, a car wash application, or the like. In some embodiments, formation of a use solution can occur from a rinse agent installed in a cleaning machine, for example onto a dish rack. The rinse agent can be diluted and dispensed from a dispenser mounted on or in the machine or from a separate dispenser that is mounted separately but cooperatively with the dish machine.

For example, in some embodiments, liquid rinse agents can be dispensed by incorporating compatible packaging containing the liquid material into a dispenser adapted to diluting the liquid with water to a final use concentration. Some examples of dispensers for the liquid rinse agent of the invention are DRYMASTER-P sold by Ecolab Inc., St. Paul, Minn.

In other example embodiments, solid products, such as cast or extruded solid compositions, may be conveniently dispensed by inserting a solid material in a container or with no enclosure into a spray-type dispenser such as the volume SOL-ET controlled ECOTEMP Rinse Injection Cylinder system manufactured by Ecolab Inc., St. Paul, Minn. Such a dispenser cooperates with a warewashing machine in the rinse cycle. When demanded by the machine, the dispenser directs a spray of water onto the cast solid block of rinse agent which effectively dissolves a portion of the block creating a concentrated aqueous rinse solution which is then fed directly into the rinse water forming the aqueous rinse. The aqueous rinse is then contacted with the dishes to affect a complete rinse. This dispenser and other similar dispensers are capable of controlling the effective concentration of the active portion in the aqueous rinse by measuring the volume of material dispensed, the actual concentration of the material in the rinse water (an electrolyte measured with an electrode) or by measuring the time of the spray on the cast block. In general, the concentration of active portion in the aqueous rinse is preferably the same as identified above for liquid rinse agents. Some other embodiments of spray-type dispenser are disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. An example of a particular product shape is shown in FIG. 9 of U.S. Pat. No. 6,258,765, which is incorporated herein by reference.

In some embodiments, the rinse aid may be formulated for a particular application. For example, in some embodiments, the rinse aid may be particularly formulated for use in warewashing machines. As discussed above, there are two general types of rinse cycles in commercial warewashing machines. A first type of rinse cycle can be referred to as a hot water sanitizing rinse cycle because of the use of generally hot rinse water (about 180° F.). A second type of rinse cycle can be referred to as a chemical sanitizing rinse cycle and it uses generally lower temperature rinse water (about 120° F.).

In some embodiments, it is believed that the rinse aid composition of the invention can be used in a high solids containing water environment in order to reduce the appearance of a visible film caused by the level of dissolved solids provided in the water. In general, high solids containing water is considered to be water having a total dissolved solids (TDS) content in excess of 200 ppm. In certain localities, the service water contains total dissolved solids content in excess of 400 ppm, and even in excess of 800 ppm. The applications where the presence of a visible film after washing a substrate is a particular problem includes the restaurant or warewashing industry, the car wash industry, and the general cleaning of hard surfaces. Exemplary articles in the warewashing industry that can be treated with a rinse aid according to the invention include dishware, cups, glasses, flatware, and cookware. For the purposes of this invention, the terms "dish" and "ware" are used in the broadest sense to refer to various types of articles used in the preparation, serving, consumption, and disposal of food stuffs including pots, pans, trays, pitchers, bowls, plates, saucers, cups, glasses, forks, knives, spoons, spatulas, and other glass, metal, ceramic, plastic composite articles commonly available in the institutional or household kitchen or dining room. In general, these types of articles can be referred to as food or beverage contacting articles because they have surfaces which are provided for contacting food and/or beverage. When used in these warewashing applications, the rinse aid should provide effective sheeting action and low foaming properties. In addition to having the desirable properties described above, it may also be useful for the rinse aid to be biodegradable, environmentally friendly, and generally nontoxic. A rinse aid of this type may be described as being "food grade".

Dispensing/Use of the Rinse Aid

In some aspects, the present invention provides methods for rinsing ware in a warewashing application using a rinse aid composition of the present invention. The method can include contacting a selected substrate with the rinse aid composition. The rinse aid can be dispensed as a concentrate or as a use solution. In addition, the rinse aid concentrate can be provided in a solid form or in a liquid form. In general, it is expected that the concentrate will be diluted with water to provide the use solution that is then supplied to the surface of a substrate. In some embodiments, the aqueous use solution may contain about 2,000 parts per million (ppm) or less active materials, or about 1,000 ppm or less active material, or in the range of about 10 ppm to about 500 ppm of active materials, or in the range of about 10 to about 300 ppm, or in the range of about 10 to 200 ppm.

The use solution can be applied to the substrate during a rinse application, for example, during a rinse cycle, for example, in a warewashing machine, a car wash application, or the like. In some embodiments, formation of a use solution can occur from a rinse agent installed in a cleaning machine, for example onto a dish rack. The rinse agent can be diluted and dispensed from a dispenser mounted on or in the machine or from a separate dispenser that is mounted separately but cooperatively with the dish machine.

For example, in some embodiments, liquid rinse agents can be dispensed by incorporating compatible packaging containing the liquid material into a dispenser adapted to diluting the liquid with water to a final use concentration. Some examples of dispensers for the liquid rinse agent of the invention are DRYMASTER-P sold by Ecolab Inc., St. Paul, Minn.

In other example embodiments, solid products, such as cast or extruded solid compositions, may be conveniently dispensed by inserting a solid material in a container or with no enclosure into a spray-type dispenser such as the volume SOL-ET controlled ECOTEMP Rinse Injection Cylinder system manufactured by Ecolab Inc., St. Paul, Minn. Such a dispenser cooperates with a warewashing machine in the rinse cycle. When demanded by the machine, the dispenser directs a spray of water onto the cast solid block of rinse agent which effectively dissolves a portion of the block creating a concentrated aqueous rinse solution which is then fed directly into the rinse water forming the aqueous rinse. The aqueous rinse is then contacted with the dishes to affect a complete rinse. This dispenser and other similar dispensers are capable of controlling the effective concentration of the active portion in the aqueous rinse by measuring the volume of material dispensed, the actual concentration of the material in the rinse water (an electrolyte measured with an electrode) or by measuring the time of the spray on the cast block. In general, the concentration of active portion in the aqueous rinse is preferably the same as identified above for liquid rinse agents. Some other embodiments of spray-type dispenser are disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. An example of a particular product shape is shown in FIG. 9 of U.S. Pat. No. 6,258,765, which is incorporated herein by reference.

In some embodiments, the rinse aid compositions may be formulated for a particular application. In some embodiments, for example, the compositions of the present invention can be formulated for use in aseptic packaging and filing operations. In other embodiments, the rinse aid may be particularly formulated for use in warewashing machines. As discussed above, there are two general types of rinse cycles in commercial warewashing machines. A first type of rinse cycle can be referred to as a hot water sanitizing rinse cycle because of the use of generally hot rinse water (about 180° F.). A second type of rinse cycle can be referred to as a chemical sanitizing rinse cycle and it uses generally lower temperature rinse water (about 120° F.). In some embodiments, the rinse aid compositions of the present invention are used at a temperature of about 180° F.

In some embodiments, it is believed that the rinse aid composition of the invention can be used in a high solids containing water environment in order to reduce the appearance of a visible film caused by the level of dissolved solids provided in the water. In general, high solids containing water is considered to be water having a total dissolved solids (TDS) content in excess of 200 ppm. In certain localities, the service water contains a total dissolved solids content in excess of 400 ppm, and even in excess of 800 ppm. The applications where the presence of a visible film after washing a substrate is a particular problem includes the restaurant or warewashing industry, the car wash industry, and the general cleaning of hard surfaces.

Exemplary articles in the warewashing industry that can be treated with a rinse aid according to the invention include plastics, dishware, cups, glasses, flatware, and cookware. For the purposes of this invention, the terms “dish” and “ware” are used in the broadest sense to refer to various types of articles used in the preparation, serving, consumption, and disposal of food stuffs including pots, pans, trays, pitchers, bowls, plates, saucers, cups, glasses, forks, knives, spoons, spatulas, and other glass, metal, ceramic, plastic composite articles commonly available in the institutional or household kitchen or dining room. In general, these types of articles can be referred to as food or beverage contacting articles because they have surfaces which are provided for contacting food and/or beverage. When used in these warewashing applications, the rinse aid should provide effective sheeting action and low foaming properties. In addition to having the desirable properties described above, it may also be useful for the rinse aid to be biodegradable, environmentally friendly, and generally nontoxic. A rinse aid of this type may be described as being “food grade”.

The rinse aid compositions may also be applied to surfaces and objects other than ware, including, but not limited to, medical and dental instruments, and hard surfaces such as vehicle surfaces. The compositions may also be used as wetting agents in a variety of applications for a variety of surfaces, e.g., as wetting agents for aseptic packaging/filling of plastic containers.

The above description provides a basis for understanding the broad meets and bounds of the invention. The following examples and test data provide an understanding of certain specific embodiments of the invention. These examples are not meant to limit the scope of the invention. Unless otherwise noted, all parts, percentages, and ratios reported in the following examples are on a weight basis, and all reagents used in the examples were obtained, or are available, from the chemical suppliers described below, or may be synthesized by conventional techniques.

EXAMPLES

The following materials are used in the examples that follow:

- Water
- Pluronic 25R2: Polyoxypropylene polyoxyethylene block
- Plurifac LF-221: Alkoxylated Alcohol
- Genapol EP-2454: Fatty alcohol alkoxylate
- Novel II 1012-GB-21: alcohol ethoxylate C10-12, 21EO
- Kathon—preservative available from Dow Chemical with active ingredient 5-chloro-2-methyl-4-isothiazolin-3-one and 2-methyl-4-isothiazolin-3-one
- Urea
- FD&C Blue #1
- FD&C Yellow #5
- Sodium Xylene Sulfonate
- Control 2 is a solid form of high solids rinse aid commercially available from Ecolab, Inc., Eagan Minnesota.
- Control 1 is a liquid rinse aid commercially available from Ecolab, Inc., Eagan Minnesota.

Sheeting Evaluation:

This test involves observation of water sheeting on twelve different types of warewash materials. The materials used for the evaluation are a polycarbonate tile, a 10 oz. glass tumbler, a china dinner plate, a melamine dinner plate, a polypropylene coffee cup, a dinex bowl, a polypropylene jug, a polysulfonate dish, a stainless steel butter knife, a polypropylene café tray, a fiberglass café tray and a stainless steel slide 316. These test materials are meticulously cleaned and then soiled with a solution containing a 0.2% Hotpoint soil which is a mixture of powder milk and margarine. The materials are then exposed to 30 second wash cycles using 160° F. city water (for high temperature evaluations) or 120° and 140° F. city water (for low temperature evaluations). The test product is measured in parts per million actives. Immediately after the warewash materials are exposed to the test product the appearance of the water draining off of the individual test materials (sheeting) is examined.

Contact Angle Measurement:

The test is used to quantitatively measure the angle at which a drop of solution contacts a test substrate. The rinse aid or surfactant(s) of desired concentration is created, then placed into the apparatus where a single drop of solution can be delivered to a test substrate of a poly propylene tray, a polypropylene coupon, a polycarbonate coupon, a melamine coupon, a glass coupon, a stainless steel 316 coupon and a fiberglass tray. The deliverance of the drop to the substrate is recorded by a camera. The video captured by the camera is sent to a computer were the contact angle can be determined. The lower the contact angle the better the solution will induce sheeting. This means that the dishware will dry more quickly and with fewer spots once it has been removed from the dish machine.

High Solids Evaluation:

This test involves rinsing glasses with high solids water containing the test rinse aid. The high TDS water is prepared by obtaining the reject water from a reverse osmosis system (R/O). The reject water from an R/O is concentrated soft water so that it has a TDS level of approximately 1000 ppm. The rationale for using the R/O reject water is to provide high TDS water chemistry closely resembling that of naturally occurring high TDS water. The water is not artificially prepared but is simply concentrated soft water. Since the reject water from the R/O is at atmospheric pressure, a booster pump is needed to re-pressurize the water before pumping it into the dishmachine under normal 20 psi flow pressure. The test rinse aid is injected into the rinse water using a conventional Ecolab dispenser (peristaltic pump). Glasses are rinsed manually for 20 seconds, allowed to dry, and then rated for film/streaks on a scale of 1 to 5, as is conventional.

Sheeting Results:

Below are several sheeting evaluations using different formulas. A dotted line signifies no sheeting, a 1 means pin point sheeting and a X means complete sheeting. The test is complete once all of the ware listed has completely sheeted. The foam level in the machine is also noted. Stable foam at any level is unacceptable. Foam that is less then ½ inch that breaks to nothing as soon as the machine is shut off is acceptable and no foam is best. Formulas used are shown in Table 1. Tables 2-5 show the results of testing with a formula of the invention compared with Control 1 and 2.

TABLE 1

| Compositions of the invention | | | | | | | | |
|---|---|---|---|---|---|---|---|---|
| Alcohol C10-16 ethoxylated | 170617 | 2.66 | 7.31 | 7.31 | 7.31 | 6.87 | 6.87 | 6.87 |
| 25R2 | 173336 | 11.16 | 10.11 | 30.70 | 30.70 | 28.84 | 28.84 | 28.84 |
| Genapol EP 2454 | 170743 | 3.68 | 19.23 | 10.11 | 10.11 | 9.50 | 9.50 | 9.50 |
| LF-221 | 178434 | 6.50 | 29.35 | 17.88 | 17.88 | 16.80 | 16.80 | 16.80 |
| SCS | 171001 | | | | | 4.00 | | |
| Sucrose | C&H sugar | | | | | | 4.00 | |
| Mirataine H2C-HA | Rhodia | | | | | | | 4.00 |
| | | | 100.00 | 100.00 | 100.00 | 100.00 | 100.00 | 100.00 |

TABLE 2

Product Test Product A
Water Type Soft water 0.5 grain

| ppm, Actives in Rinse Aid | 40 | 50 | 60 | 70 | 80 | 90 | 100 | 110 | 120 | 130 | 140 |
|---|---|---|---|---|---|---|---|---|---|---|---|
| Glass tumbler | — | — | 1 | 1 | X | X | X | X | X | X | X |
| China Plate | — | — | — | 1 | X | X | X | X | X | X | X |
| Melamine Plate | X | X | X | X | X | X | X | X | X | X | X |
| Polypropylene Cup (yellow) | — | — | — | — | — | — | 1 | 1 | 1 | X | X |
| Dinex Bowl (blue) | — | — | — | — | — | — | — | 1 | 1 | X | X |
| Polypropylene Jug (blue) | — | — | — | — | 1 | 1 | 1 | X | X | X | X |
| Polysulfonate Dish (clear tan) | — | — | 1 | 1 | X | X | X | X | X | X | X |
| Stainless Steel Knife | — | — | — | — | 1 | 1 | X | X | X | X | X |
| Polypropylene tray (peach) | — | — | — | — | — | — | — | — | — | — | — |
| Fiberglass tray (tan) | — | — | 1 | 1 | 1 | 1 | X | X | X | X | X |
| Stainless steel slide 316 | — | — | 1 | 1 | 1 | 1 | 1 | X | X | X | X |
| Temperature, ° F. | 157 | 157 | 157 | 157 | 157 | 157 | 157 | 157 | 157 | 157 | 157 |
| Suds | none | none | none | none | none | none | none | none | none | none | none |

TABLE 3

Product Control 1
Water Type Soft Water

| ppm, Actives in Rinse Aid | 40 | 50 | 60 | 70 | 80 | 90 | 100 | 110 | 120 | 130 | 140 |
|---|---|---|---|---|---|---|---|---|---|---|---|
| Polycarbonate Tile | — | — | — | — | — | — | 1 | 1 | 1 | 1 | X |
| Glass tumbler | — | — | — | — | 1 | 1 | 1 | X | X | X | X |
| China Plate | — | — | — | 1 | 1 | 1 | 1 | X | X | X | X |
| Melamine Plate | — | — | 1 | 1 | X | X | X | X | X | X | X |
| Polypropylene Cup | — | — | — | — | — | 1 | 1 | 1 | 1 | X | X |
| Dinex Bowl | — | — | — | — | — | — | 1 | 1 | 1 | 1 | X |
| Polypropylene Jug | — | — | — | — | — | 1 | 1 | 1 | 1 | X | X |
| Polysulfonate Dish | — | — | — | — | 1 | 1 | 1 | X | X | X | X |
| Stainless Steel Knife | — | — | — | — | 1 | 1 | X | X | X | X | X |
| Polypropylene tray | — | — | — | — | — | — | — | — | — | — | — |
| Fiberglass tray | — | — | — | — | — | 1 | X | X | X | X | X |
| Stainless steel slide 316 | — | — | 1 | 1 | X | X | X | X | X | X | X |
| Temperature, ° F. | 150 | 150 | 150 | 150 | 150 | 150 | 150 | 150 | 150 | 150 | 150 |
| Suds | none | none | none | none | none | none | none | none | none | none | none |

TABLE 4a

Product Initial Prototype with Type I, II, III Surfactant
Water Type Soft Water

| ppm, Actives in Rinse Aid | 40 | 50 | 60 | 70 | 80 | 90 | 100 | 110 |
|---|---|---|---|---|---|---|---|---|
| Polycarbonate Tile | — | — | — | — | — | 1 | 1 | X |
| Glass tumbler | — | — | — | 1 | 1 | 1 | X | X |
| China Plate | — | — | 1 | 1 | X | X | X | X |
| Melamine Plate | — | — | 1 | 1 | X | X | X | X |

TABLE 4a-continued

| | | | | | | | | |
|---|---|---|---|---|---|---|---|---|
| Polypropylene Cup | — | — | — | — | — | 1 | X | X |
| Dinex Bowl | — | — | — | — | — | 1 | X | X |
| Polypropylene Jug | — | — | — | — | — | 1 | 1 | X |
| Polysulfonate Dish | — | — | — | — | 1 | 1 | X | X |
| Stainless Steel Knife | — | — | — | — | 1 | X | X | X |
| Polypropylene tray | — | — | — | — | — | 1 | 1 | X |
| Fiberglass tray (tan) | — | — | — | — | — | 1 | X | X |
| Stainless steel slide 316 | — | — | 1 | 1 | 1 | X | X | X |
| Temperature, ° F. | 150 | 150 | 150 | 150 | 150 | 150 | 150 | 150 |
| Suds | none | none | none | none | none | none | none | none |

TABLE 4b

| Product Control 2<br>Water Type Soft water 0 grain | | | | | | | | | | | | | | | | | |
|---|---|---|---|---|---|---|---|---|---|---|---|---|---|---|---|---|---|
| ppm, Actives in Rinse Aid | 40 | 50 | 60 | 70 | 80 | 90 | 100 | 110 | 120 | 130 | 140 | 150 | 160 | 170 | 180 | 190 | 200 |
| Glass tumbler | 1 | 1 | 1 | X | X | X | X | X | X | X | X | X | X | X | X | X | X |
| China Plate | 1 | 1 | 1 | X | X | X | X | X | X | X | X | X | X | X | X | X | X |
| Melamine Plate | 1 | 1 | X | X | X | X | X | X | X | X | X | X | X | X | X | X | X |
| Polypropylene Cup | — | — | — | — | — | — | — | — | — | 1 | 1 | 1 | 1 | 1 | 1 | 1 | 1 |
| Dinex Bowl | — | — | — | — | — | 1 | 1 | 1 | 1 | 1 | 1 | 1 | 1 | 1 | X | X | X |
| Polypropylene Jug | — | — | — | — | — | — | 1 | 1 | 1 | 1 | 1 | 1 | 1 | 1 | 1 | 1 | X |
| Polysulfonate Dish | — | 1 | 1 | 1 | 1 | 1 | 1 | X | X | X | X | X | X | X | X | X | X |
| Stainless Steel Knife | — | — | 1 | 1 | X | X | X | X | X | X | X | X | X | X | X | X | X |
| Polypropylene tray | — | — | — | — | — | — | — | — | — | — | — | — | — | — | — | — | — |
| Fiberglass tray | — | — | 1 | 1 | 1 | 1 | 1 | 1 | X | X | X | X | X | X | X | X | X |
| Stainless steel slide 316 | 1 | 1 | 1 | 1 | X | X | X | X | X | X | X | X | X | X | X | X | X |
| Temperature, ° F. | 160 | 160 | 160 | 160 | 160 | 160 | 160 | 160 | 160 | 160 | 160 | 160 | 160 | 160 | 160 | 160 | 160 |
| Suds | none | none | none | none | none | none | none | none | none | none | none | none | none | none | none | none | none |

The Sheeting test results clearly show that the high solids formulations with the combinations of the Type 1 (25R2), Type II (Genapol) and Type III (LF-221) surfactants are superior in sheeting to two well established inline formulations Control 2 and Control 1. The better sheeting results are shown across all substrates tested, especially on the plastic substrates.

Contact Angle Results:

The contact angle measures the angle where the edge of the liquid droplet and the substrate make contact. Consider a fixed volume of a liquid on a substrate; if the contact angle is low, the liquid will spread to a flatter drop with a larger volume; if the contact angle is high, the liquid will "bead up" (smaller contact area but taller drop). Though the overall mechanisms are extremely complicated, we believe that low contact angle, which is related to good wetting, has good correlation with good sheeting, faster drainage, faster drying, with less spot and film. Table 5 shows contact angle measurements of the compositions of the invention as compared to Control 2 and 1.

TABLE 5

| Contact angle (in degrees) study of products: | | | | | |
|---|---|---|---|---|---|
| Surface | Control 3 | Control 2 | Test Product A | Control 1 | Initial Prototype with Type I, II & III Surfactant |
| Polypropylene Tray | 21.84° | 58.18° | 35.8° | 54.38° | 29.22° |
| Polycarbonate | 21.82° | 47.05° | 32.07° | 40.31° | 21.96° |
| Melamine | 21.8° | — | 23.34° | — | — |
| Glass | 15.13° | 26.09° | 21.39° | 23.26° | 9.80° |
| Stainless steel 316 | 27.98° | 52.19° | 34.61° | 39.43° | 22.22° |
| Fiberglass tray | 25.39° | 45.13° | 31.36° | 41.95° | 19.93° |

Contact Angle Study of Individual Surfactants and Combinations of Surfactants:

FIG. 1 shows the average of the contact angle on polycarbonate, polypropylene, fiberglass, stainless steel 316, and glass surfaces The Type 1 (25R2), Type II (Genapol) and Type III (LF-221) technology along with several different high solid TDS components. The measurements were made for fixed total concentration (~129.2 ppm active concentration of surfactant(s)).

This is an especially important study as it shows the interactions between surfactants with the differing high solids TDS raw materials. It shows how the different TDS components affect the contact angle. Formulas for each set are listed below in Table 6. Results are shown in Table 7.

TABLE 6

| Prototypes | | E % | S-1 % | S-2 % | CM-2 % | S-8 % | PG-1 % | PG-5 % | PG-6 % | PG-7 % | S-15 % |
|---|---|---|---|---|---|---|---|---|---|---|---|
| Urea | | 30.00 | 20.00 | 20.00 | 25.00 | 30.00 | 30.00 | 30.00 | 30.00 | 30.00 | 30.00 |
| Water | | 4.00 | 4.00 | 4.00 | 4.00 | 4.00 | 0.00 | 4.00 | 0.00 | 0.00 | 4.00 |
| FDRA surf no LF 500 | | 66.00 | 66.00 | 61.40 | 66.00 | 59.00 | 66.00 | 62.00 | 62.00 | 62.00 | 62.00 |
| Alcohol C10-16 ethoxylated | 2.66 | 7.31 | 7.31 | 6.80 | 7.31 | 6.53 | 7.31 | 6.87 | 6.87 | 6.87 | 6.87 |
| 25R2 | 3.68 | 10.11 | 10.11 | 9.41 | 10.11 | 9.04 | 10.11 | 9.50 | 9.50 | 9.50 | 9.50 |
| Genapol EP 2454 | 7.00 | 19.23 | 19.23 | 17.89 | 19.23 | 17.19 | 19.23 | 18.07 | 18.07 | 18.07 | 18.07 |
| LF-221 | 10.68 | 29.35 | 29.35 | 27.30 | 29.35 | 26.23 | 29.35 | 27.57 | 27.57 | 27.57 | 27.57 |
| Sodium Sulfate | | 0.00 | 10.00 | 10.00 | 0.00 | 0.00 | 0.00 | 0.00 | 0.00 | 0.00 | 0.00 |
| SXS 96% | | 0.00 | 0.00 | 4.60 | 0.00 | 0.00 | 0.00 | 0.00 | 0.00 | 0.00 | 0.00 |
| CMC | | 0.00 | 0.00 | 0.00 | 5.00 | 0.00 | 0.00 | 0.00 | 0.00 | 0.00 | 0.00 |
| Sodium bisulfate | | | | | | 7.00 | | | | | |
| Propylene glycol | | 0.00 | 0.00 | 0.00 | 0.00 | 0.00 | 4.00 | 0.00 | 0.00 | 0.00 | 0.00 |
| Bayhibit S | | 0.00 | 0.00 | 0.00 | 0.00 | 0.00 | 0.00 | 4.00 | 0.00 | 0.00 | 0.00 |
| Belclene 810 (50%) | | 0.00 | 0.00 | 0.00 | 0.00 | 0.00 | 0.00 | 0.00 | 8.00 | 0.00 | 0.00 |
| EXP5242F (44%) | | 0.00 | 0.00 | 0.00 | 0.00 | 0.00 | 0.00 | 0.00 | 0.00 | 8.00 | 0.00 |
| Acusol 445ND | | 0.00 | 0.00 | 0.00 | 0.00 | 0.00 | 0.00 | 0.00 | 0.00 | 0.00 | 4.00 |

TABLE 7

| Prototypes | | 2% | 3% | 4% | 5% |
|---|---|---|---|---|---|
| Urea | | | | | |
| Urea not rinse aid grade | | 30.00 | 30.00 | 30.00 | 30.00 |
| Water | | 4.00 | 4.00 | 4.00 | 4.00 |
| FDRA surf no LF 500 | | 66.00 | 62.00 | 62.00 | 62.00 |
| Alcohol C10-16 ethoxylated | 2.66 | 7.31 | 6.87 | 6.87 | 6.87 |
| 25R2 | 11.16 | 30.70 | 28.84 | 28.84 | 28.84 |
| Genapol EP 2454 | 3.68 | 10.11 | 9.50 | 9.50 | 9.50 |
| LF-221 | 6.50 | 17.88 | 16.80 | 16.80 | 16.80 |
| SCS | | | 4.00 | | |
| Sucrose | | | | 4.00 | |
| Mirataine H2C-HA | | | | | 4.00 |
| | | 100.00 | 100.00 | 100.00 | 100.00 |

This data shows a preferred low contact angle with Control 3 (8% act. SXS) and compositions of the invention Control 3 is based from, S-2 (4.6% act. SXS), Test Product A (75% act. SXS), and Test Product B (80% act. SXS).

Sold Characteristics Measured with DSC Scans:

The data suggests that SXS is a crystal inhibitor at low to intermediate percent. We can still form a good solid by using high levels of urea and low levels of water and keeping SXS below 3-4%. But at high percent SXS (70-85%) SXS is a crystal former and can also be a solidification agent. Tables 8-10 show the ability of SXS to act as a solidification agent for pressed, extruded and cast solid formulations. Table 11 shows the formulations.

TABLE 8

| Prototypes - Pressed Solids | | | | | | | | |
|---|---|---|---|---|---|---|---|---|
| Formula | Urea % | Water % | Surfactant blend % | TDS component | Sulfate % | TDS inhibitor % | T (Peak A) ° C. | T (Peak B) ° C. |
| 3 | 30.48 | 1.90 | 64.76 | SXS | — | 4.76 | 82.43 | 126.73 |
| L | 30.60 | 2.72 | 62.59 | SXS | — | 4.09 | 84.12 | 122.41 |
| M | 30.00 | 2.68 | 61.40 | SXS | — | 4.02 | 52.04 | 108.06 |
| K | 30.00 | 4.00 | 61.40 | SXS | — | 4.60 | 80.94 | 144.80 |
| D | 30.00 | 1.88 | 65.62 | SXS | — | 2.50 | 93.18 | 124.78 |
| 6 | 29.27 | 4.02 | 68.29 | SXS | — | 2.44 | 84.43 | 124.73 |
| 4 | 29.09 | 1.82 | 61.82 | SXS | — | 9.09 | 85.94 | 127.06 |
| 6 | 29.27 | 4.02 | 68.29 | SXS | — | 2.44 | 84.43 | 124.73 |
| 7 | 27.91 | 3.83 | 65.12 | SXS | 4.65 | 2.33 | 83.60 | 124.06 |
| F | 35.00 | 1.81 | 63.19 | Sugar | — | 5.00 | 95.69 | 137.92 |
| E | 30.00 | 1.81 | 63.19 | SCS | — | 5.00 | 87.85 | 113.12 |

TABLE 8-continued

Prototypes - Pressed Solids

| Formula | Urea % | Water % | Surfactant blend % | TDS component | Sulfate % | TDS inhibitor % | T (Peak A) ° C. | T (Peak B) ° C. |
|---|---|---|---|---|---|---|---|---|
| a | — | 4.80 | 19 | SXS | — | 76.2 | 77.49 | — |
| b | — | 4.50 | 18.2 | SXS/Prop. Glycol | — | 72.7/4.5 | 98.29 | 136.93 |
| C | — | 4.50 | 18.2 | SXS/SSL | — | 72.7/4.5 | 78.86 | — |
| d | — | 2.00 | 30 | SXS/SSL | — | 50/20 | 68.28 | — |
| 2a | — | 1.20 | 20 | SXS/Citric acid | — | 77.6/1.2 | 77.68 | — |
| 3a | — | — | 20 | SXS/Citric acid | — | 77.6/2.4 | 81.19 | — |
| 4a | 1.20 | 1.20 | 20 | SXS | — | 77.6 | 76.34 | 118.04 |
| 6a | — | 1.20 | 20 | SXS/CMC | — | 77.6/1.2 | 66.742 | — |

TABLE 9

Prototypes - Extruded Solids

| Formula | Urea % | Water % | Surfactant blend % | TDS component | Sulfate % | TDS inhibitor % | T (Peak A) ° C. | T (Peak B) ° C. |
|---|---|---|---|---|---|---|---|---|
| P080511 sp 5 | 42.86 | 1.5 | 52.38 | SXS | 0.00 | 4.76 | 72.15 | 113.01 |
| P062711 sp 2 | 34.15 | 1.81 | 61.61 | SXS | 0.00 | 2.44 | 89.23 | 114.86 |
| P062711 sp 3 | 33.33 | 1.71 | 60.13 | SXS | 0.00 | 4.76 | soft product | |
| P062711 sp 5 | 31.11 | 1.65 | 57.62 | SXS | 8.89 | 2.22 | 86.08 | 122.87 |
| P062711 sp 8 | 32.41 | 4.31 | 58.65 | SXS | 0.00 | 4.63 | soft product | |
| P040311 sp 4 | 29.09 | 1.82 | 60.00 | SXS | 0.00 | 9.09 | soft product | |
| P060311 sp 3 | 30.00 | 1.81 | 65.69 | SCS | 0.00 | 5.00 | soft product | |
| P060311 sp 5 | 35.00 | 1.81 | 63.19 | Sugar | 0.00 | 5.00 | soft product | |
| Test Product A | — | 0.71 | 24.29 | SXS | 0.00 | 75.00 | 80.52 | — |
| Test Product B | — | 0.57 | 19.43 | SXS | 0.00 | 80.00 | 79.21 | — |
| P113011 sp 4 | — | 1.05 | 22.2 | SXS | 0.00 | 77.80 | 90.91 | — |
| P110911 sp 7 | 0.11 | 0.74 | 21.7 | SXS | 0.00 | 78.20 | 114.84 | 143.77 |

TABLE 10

Cast Solid

| Formula | PEG 800 % | Water % | Surfactant blend % | TDS component | Sulfate % | TDS inhibitor % | T (Peak A) ° C. | T (Peak B) ° C. | T (Peak C) ° C. |
|---|---|---|---|---|---|---|---|---|---|
| Control 2 | 29.3325 | 1.1576 | 48.62 | SXS/dequest 2 | 2.375 | 11.625/6 | 39.17 | 52.88 | 143.99 |

TABLE 11

| Surfactant Premix | Pmx 1 | Pmx 2 | Pmx 2 | Pmx 4 |
|---|---|---|---|---|
| Novel 1012-21 | 11.08 | 11.08 | 18.3 | |
| 25R2 | 15.32 | 46.51 | 42.7 | |
| Genapol EP2454 | 29.14 | 15.32 | | |
| LF-221 | 44.46 | 27.09 | | |
| Abi B 9950 | | | 2.0 | |
| 25R8 | | | | 20.00 |
| LDO97 | | | | 28.62 |

High Solids Rinse Aid Evaluation

Water is generated with an RO system to deliver approximately 1000 ppm 0 grains, 700-800 TDS 8-10 grains, and 300-400 TDS 17 grains. This water is run through a dish machine rinse arms at 20 psi. The rinse aid being tested is injected into the rinse water using a conventional Ecolab dispenser (peristaltic pump). Glasses are rinsed manually for 20 seconds, allowed to dry, and then rated for film/streaks on a scale of 1 to 5, as is conventional.

Results show in Tables 12-14 below indicate that at 860 ppm TDS a lower ppm SXS 36.71 is adequate. At 1366 ppm TDS a higher ppm SXS 161.22 gives better overall result.

TABLE 12

| IPDTP SOP method 32A | |
|---|---|
| Date | Sept. 24, 2010 |
| TDS | 860 |
| Grains of hardness | 9 |
| PSI | 20 |
| Rinse Temp (° F.) | 180 |
| Manul rinse time (Seconds) | 20 |
| 30 ppm less activity | |

| Formula tested | HDHC mls/ rack | Formula % active SXS | ppm active SXS in test solution | Film avg |
|---|---|---|---|---|
| Water | | | | 3.75 |
| Control 4 | 2 | 22.72 | 120.56 | 2.50 |
| Control 4A | 2 | 22.72 | 120.56 | 2.50 |
| Control 5 | 1 | 4.00 | 9.60 | 2.50 |
| Control 5A | 1 | 4.00 | 9.60 | 3.00 |
| Control 1 | 3 | 31.84 | 241.83 | 2.50 |
| Initial Prototype | 3 | 31.84 | 241.83 | 2.50 |
| Control 6 | 2 | 0.00 | 0.00 | 3.75 |
| Control 6A | 2 | 0.00 | 0.00 | 3.00 |
| Conrol 3 | 2 | 8.00 | 36.71 | 2.50 |

TABLE 13

| Date | | Jun. 24, 2011 | | Jun. 24, 2011 | |
|---|---|---|---|---|---|
| TDS | | 700 | | 1000 | |
| Grains of hardness | | 7 | | 1 | |
| PSI | | 20 | | 20 | |
| Rinse Temp (° F.) | | 180 | | 180 | |
| Manul rinse time (Seconds) | | 20 | | 20 | |
| **Formula tested** | **HDHC mls/rack** | **Formula % active SXS** | **ppm active SXS in test solution** | **Film avg** | **Film avg** |
| 4 glass placement | | | | | |
| Water | N/A | | | 2.25 | 3.75 |
| Control 4 | 2 ml | 22.72 | 120.56 | 3.00 | 2.38 |
| Control 1 | 3 ml | 31.84 | 241.83 | 2.13 | 2.75 |
| Control 2A dequest 2016 | 5% 4 ml | 11.16 | 9.83 | 2.63 | 3.13 |
| Control 2B no Dequest 2.8% CMC | 5% 4 ml | 11.16 | 9.83 | 3.25 | 3.13 |
| Diagonal 6 glass placement | | | | | |
| Water | N/A | | | 2.50 | 3.75 |
| Control 4 | 2 ml | 22.72 | 120.56 | 3.00 | 2.58 |
| Control 1 | 3 ml | 31.84 | 241.83 | 2.17 | 2.83 |
| Control 2A 6% dequest 2016 | 5% 4 ml | 11.16 | 9.83 | 2.67 | 2.83 |
| Control 2B no Dequest 2.8% CMC | 5% 4 ml | 11.16 | 9.83 | 3.25 | 3.08 |

TABLE 14

| Date | | | | Dec. 15, 2009 | Dec. 15, 2009 | Dec. 15, 2009 |
|---|---|---|---|---|---|---|
| TDS | | | | 364 | 805 | 1366 |
| Grains of hardness | | | | 18 | 10 | 1 |
| PSI | | | | 20 | 20 | 20 |
| Rinse Temp (° F.) | | | | 180 | 180 | 180 |
| Manul rinse time (Seconds) | | | | 20 | 20 | 20 |
| **Formula tested** | **ml/rack** | **Formula % active SXS** | **ppm active SXS in test solution** | **Film avg** | **Film avg** | **Film avg** |
| Water | | | | 2.50 | 3.75 | 4.50 |
| Control 4 | 2 | 22.72 | 120.56 | 2.25 | 4.25 | 4.25 |
| Control 4A | 2 | 22.72 | 120.56 | 2.25 | 4.25 | 4.25 |
| Control 5 | 2 | 4.00 | 19.19 | 1.50 | 3.25 | 4.50 |
| Control 5A | 2 | 4.00 | 19.19 | 1.50 | 2.75 | 4.75 |
| Control 1 | 2 | 31.83 | 161.22 | 2.25 | 2.75 | 4.00 |
| Initial Prototype | 2 | 31.83 | 161.22 | 2.00 | 2.50 | 3.75 |
| Control 6 | 2 | 0.00 | 0.00 | 1.50 | 3.00 | 4.50 |
| Control 6A | 2 | 0.00 | 0.00 | 1.50 | 3.00 | 4.50 |
| Control 3 | 2 | 8.00 | 36.71 | 3.25 | 4.00 | 4.50 |

Other Embodiments

It is to be understood that while the invention has been described in conjunction with the detailed description thereof, the foregoing description is intended to illustrate, and not limit the scope of the invention, which is defined by the scope of the appended claims. Other aspects, advantages, and modifications are within the scope of the following claims.

In addition, the contents of all patent publications discussed supra are incorporated in their entirety by this reference.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The invention claimed is:

1. A solid rinse aid composition comprising:

from about 60 wt % to about 90 wt % of one or more short chain alkyl benzene and/or alkyl naphthalene sulfonates selected from the group consisting of:

sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butylnaphthalene sulfonate; and from about 15 wt % to about 30 wt % of a sheeting agent; and from about 1 wt. % to about 25 wt. % of an association disruption agent.

2. The solid rinse aid composition of claim 1 wherein said short chain alkyl benzene and/or alkyl naphthalene sulfonate is sodium xylene sulfonate.

3. The solid rinse aid composition of claim 1 further comprising a preservative.

4. The solid rinse aid composition of claim 1 further comprising a defoamer.

5. The solid rinse aid composition of claim 4 wherein said defoamer comprises a block copolymer compound including one or more ethylene oxide groups.

6. The solid rinse aid composition of claim 1 wherein said association disruption agent is an alcohol alkoxylate and the alkoxylate is selected from the group consisting of ethylene oxides, propylene oxides, butylene oxides, pentylene oxides, hexylene oxides, heptylene oxides, octylene oxides, nonylene oxides, decylene oxides and mixtures and derivatives thereof.

7. The solid rinse aid composition of claim 1 wherein aid said sheeting agent comprises one or more alcohol ethoxylates of Formula (I):

$$R—O—(CH_2CH_2O)_n—H \quad (I)$$

wherein R is a C1-C12 alkyl group and n is an integer in the range of 15 to 30.

8. The solid rinse aid composition of claim 1 wherein the sheeting agent comprises two or more alcohol ethoxylates.

9. The solid rinse aid composition of claim 1, wherein the sheeting agent does not include an alcohol ethoxylate with an alkyl group that has more than 12 carbon atoms.

10. The solid rinse aid composition of claim 1 further comprising an additional solidification agent of polyethylene glycol.

11. A method for rinsing ware in a warewashing application comprising:

(a) providing a solid rinse aid composition according to claim 1;

(b) contacting the rinse aid composition with water to form a use solution; and (c) applying the use solution to the ware.

12. The method of claim 11 wherein said use solution comprises 2,000 ppm or less active materials.

13. The method of claim 11 wherein said contacting is by spraying water onto a solid block of rinse aid.

14. The method of claim 13 wherein said solid rinse aid composition is dissolved into a use solution by said spraying.

15. The method of claim 11 wherein said ware comprises plasticware.

16. The method of claim 11 wherein the ware dries within about 30 to about 90 seconds after the use solution is applied to the ware.

* * * * *